United States Patent
Ogishima et al.

(10) Patent No.: US 6,950,161 B2
(45) Date of Patent: Sep. 27, 2005

(54) LIQUID CRYSTAL DISPLAY DEVICE

(75) Inventors: Kiyoshi Ogishima, Soraku-gun (JP); Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 32 days.

(21) Appl. No.: 10/993,363

(22) Filed: Nov. 22, 2004

(65) Prior Publication Data

US 2005/0088608 A1 Apr. 28, 2005

Related U.S. Application Data

(63) Continuation of application No. 10/654,403, filed on Sep. 4, 2003, now Pat. No. 6,822,724.

(30) Foreign Application Priority Data

Sep. 6, 2002 (JP) .................................. 2002-262152

(51) Int. Cl.[7] ............................................. G02F 1/1337
(52) U.S. Cl. ..................... 349/130; 349/129; 349/143
(58) Field of Search ................................ 349/129, 130, 349/143

(56) References Cited

U.S. PATENT DOCUMENTS

| | | | |
|---|---|---|---|
| 4,941,737 A | 7/1990 | Kimura | |
| 5,541,753 A | 7/1996 | Raynes et al. | |
| 6,094,252 A | 7/2000 | Itoh et al. | |
| 6,166,798 A | 12/2000 | Plach et al. | |
| 6,384,889 B1 | 5/2002 | Miyachi et al. | |
| 2002/0036740 A1 | 3/2002 | Kubo et al. | |

*Primary Examiner*—Toan Ton
(74) *Attorney, Agent, or Firm*—Nixon & Vanderhye, P.C.

(57) ABSTRACT

A liquid crystal display device of a vertical alignment mode is provided in which a quenching pattern, which is generated by such liquid crystal molecules whose in-plane component of the alignment directions under applied voltage is aligned along the cross nicole directions, is unrecognizable for a user. In the liquid crystal display device of a vertical alignment mode, a liquid crystal layer is has a defined value of d/p between $0.0021 \times (Vmax)^2 - 0.0458 \times (Vmax) + 0.65$ and $0.0021 \times (Vmax)^2 - 0.0458 \times (Vmax) + 0.50$, and a defined value of $d \cdot \Delta n / \lambda$ between $-0.00026 \times (Vmax)^3 + 0.016 \times (Vmax)^2 - 0.2281 \times (Vmax) + 2.124$ and $-0.00026 \times (Vmax)^3 + 0.016 \times (Vmax)^2 - 0.2281 \times (Vmax) + 1.7603$, where Vmax [V] is the maximum applied effective voltage applied to the liquid crystal layer.

11 Claims, 34 Drawing Sheets p=0
d · Δn=380nm
IN THE VICINITY OF THE SURFACE OF
THE COUNTER ELECTRODE p=0
d · Δn=380nm
IN THE VICINITY OF THE MIDDLE OF
THE LIQUID CRYSTAL LAYER p=0
d · Δn=380nm
IN THE VICINITY OF THE SURFACE OF
THE PICTURE ELEMENT ELECTRODE p=0
d · Δn=380nm d/p=0.13
d · Δn=500nm
IN THE VICINITY OF THE SURFACE
OF THE COUNTER ELECTRODE d/p=0.13
d · Δn=500nm
IN THE VICINITY OF THE MIDDLE OF
THE LIQUID CRYSTAL LAYER d/p=0.13
d · Δn=500nm
IN THE VICINITY OF THE SURFACE
OF THE PICTURE ELEMENT ELECTRODE d/p=0.13
d·Δn=500nm d/p=0.38
d · Δn=600nm
IN THE VICINITY OF THE SURFACE
OF THE COUNTER ELECTRODE d/p=0.38
d · Δn=600nm
IN THE VICINITY OF THE MIDDLE
OF THE LIQUID CRYSTAL LAYER d/p=0.38
d · Δn=600nm
IN THE VICINITY OF THE SURFACE
OF THE PICTURE ELEMENT ELECTRODE d/p=0.38
d·Δn=600nm

TRANSMISSION INTENSITY d/p=0.48
d · Δn=680nm
IN THE VICINITY OF THE SURFACE
OF THE COUNTER ELECTRODE d/p=0.48
d · Δn=680nm
IN THE VICINITY OF THE MIDDLE OF
THE LIQUID CRYSTAL LAYER d/p=0.48
d · Δn=680nm
IN THE VICINITY OF THE SURFACE OF
THE PICTURE ELEMENT ELECTRODE d/p=0.48
d·Δn=680nm (a) s=2.75 μm
(b) s=2.25 μm

LIQUID CRYSTAL DISPLAY DEVICE

This application is a continuation of U.S. Ser. No. 10/654,403 filed Sep. 4, 2003 now U.S. Pat. No. 6,822,724, which claims priority of JP application 2002-262152 filed Sep. 6, 2002, both of which are incorporated herein by reference.

FIELD OF THE INVENTION

The present invention relates to a liquid crystal display employing a vertically alignment mode.

BACKGROUND OF THE INVENTION

Conventionally, liquid crystal devices have been widely used as a screen for word processors and computers, and recently have been pervasive as a screen for televisions. Most of the liquid crystal display devices employ a TN (Twisted Nematic) mode. However, the TN mode liquid crystal display device has problems that contrast decreases and tone characteristic inversion is likely to occur when viewed on an angle.

To improve a viewing angle characteristic in an angled direction, a liquid crystal display device employing a VA (Vertically Alignment) mode has come to receive attention in these years. For example, a VA mode liquid crystal display device is disclosed in U.S. Pat. No. 6,384,889 (patented on May 7, 2002; hereinafter referred to as conventional example) corresponding to Japanese Laid-Open Patent Application No. 2000-47251 (Tokukai 2000-47251; published on Feb. 18, 2000). A liquid crystal cell of the VA mode liquid crystal device is composed of vertical alignment layers and a nematic liquid crystal having a negative dielectric anisotropy.

In the VA mode liquid crystal display device, liquid crystal molecules are aligned in a vertical direction under no applied voltage. When linearly polarized light from a polarization plate enters the liquid crystal layer having the liquid crystal molecules in this state, the light leaves the liquid crystal layer as linearly polarized light without changing the state of polarization, because the liquid crystal layer has almost no birefringence anisotropy. The linearly polarized light is then absorbed by a polarization plate located on the other side of the liquid crystal layer. As a result, the liquid crystal display device can produce black display.

On the other hand, when a voltage is applied, the liquid crystal molecules in the liquid crystal layer are tilted according to the applied voltage. Here, when the liquid crystal molecules are radially aligned as shown in the conventional example for example, the aligned direction of the liquid crystal molecules continuously varies even within a picture element region.

Further, among these types of liquid crystal display devices, there has been a liquid crystal display device in which a chiral dopant is added to vary the alignment of the liquid crystal molecules in a spiral manner along the thickness direction of the liquid crystal layer, as in the normal twisted alignment. This reduces a dark field portion, thereby improving brightness of the liquid crystal device.

In the foregoing conventional example, (U.S. Pat. No. 6,384,889), as described in the first paragraph of EXAMPLE 7 (corresponding to paragraph [0039] in Tokukai 2000-47251) for example, a chiral dopant is added so that a chiral pitch of 18 [$\mu$m], which is about four times the cell thickness, is obtained, and a twist angle is set to be about 90 degrees under applied voltage. Under these conditions, a serious quenching pattern remains over a large area and with high intensity, resulting in decrease in transmission intensity and decrease in brightness.

Further, the liquid crystal display device disclosed in U.S. Patent Application Publication No. 0036740 (published on Mar. 28, 2002) includes a structure in which liquid crystal has a twisted structure for the stable alignment of the liquid crystal. However, this publication does not have a notion of eliminating the quenching pattern, or improving the transmittance by eliminating the quenching pattern. Further, the publication does not disclose optimizing the quenching pattern or transmittance.

SUMMARY OF THE INVENTION

An object of the present invention is to provide a liquid crystal display device of a vertical alignment mode having a high transmission intensity, i.e., high brightness, the invention realizing the liquid crystal display device (A) by reducing a quenching pattern, which is generated according to a relationship between (i) directions of polarization axes of two polarization plates which are arranged in a cross nicole manner and (ii) an alignment direction of liquid crystal molecules under applied voltage, to such a degree as to be completely unrecognizable for a user, and (B) by determining optical physical property values that can maximize the transmission intensity.

In order to achieve the foregoing object, the present invention provides a liquid crystal display device which includes a first substrate, a second substrate, and a liquid crystal layer between the first substrate and the second substrate, the liquid crystal layer being vertically aligned when no voltage is applied across (i) a first electrode provided on the first substrate and (ii) a second electrode provided on the second substrate so as to face the first electrode via the liquid crystal layer, the liquid crystal layer having a twisted structure and being aligned parallel to the substrates when a voltage is applied across the first electrode and the second electrode, whereby the liquid crystal display device has a defined value for d/p between $0.0021\times(Vmax)^2 - 0.0458\times(Vmax)+0.65$ and $0.0021\times(Vmax)^2 - 0.0458\times(Vmax)+0.50$, and has a defined value for $d\cdot\Delta n/\lambda$ between $-0.00026\times(Vmax)^3 + 0.016\times(Vmax)^2 - 0.2281\times(Vmax) + 2.124$ and $-0.00026\times(Vmax)^3 + 0.016\times(Vmax)^2 - 0.2281\times(Vmax) + 1.7603$, where d/p is the ratio of a thickness d of the liquid crystal layer with respect to the natural twist pitch p of a liquid crystal, Vmax [V] is the maximum applied effective voltage across the first electrode and the second electrode, and $\Delta n$ is the refractive anisotropy of the liquid crystal layer.

With this arrangement, when no voltage is applied across the first and the second electrodes, the liquid crystal molecules in the liquid crystal layer are vertically aligned. This causes no birefringent effect or optical rotatory effect, so that the light passes through the liquid crystal layer and leaves the liquid crystal layer almost unaffected. On the other hand, when a voltage is applied, the liquid crystal layer assumes a twisted structure and the liquid crystal molecules are aligned parallel to the substrates, thereby causing the birefringent effect and optical rotatory effect. As a result, the state of light that leaves the liquid crystal layer can be changed depending on whether or not a voltage is applied, enabling the display state to be changed in accordance with the voltage.

The inventors of the present invention have diligently worked on a liquid crystal display device of a vertical alignment mode (A) to reduce a quenching pattern, which is generated according to a relationship between (i) directions of polarization axes of polarization plates which are arranged in a cross nicole manner and (ii) an alignment direction of liquid crystal molecules when a voltage is applied, to such a degree as to be unrecognizable for a user, and (B) to determine optical physical property values that can maximize the transmission intensity. As a result, the inventors of the present invention have accomplished the present invention by finding that (1) the liquid crystal molecules in the vicinity of the substrates remain vertically aligned even under applied voltage by the pre-applied regulating forces acting on the liquid crystal molecules, because the liquid crystal molecules are vertically aligned under no applied voltage in the liquid crystal display device of a vertical alignment mode, (2) the thickness of a portion of the liquid crystal molecules where the birefringent effect and optical rotatory effect are generated is accordingly thinner than the actual thickness of the liquid crystal layer, and (3) the thickness of this portion of the liquid crystal molecules varies in accordance with an applied voltage.

Namely, in the liquid crystal display device of the present invention, the liquid crystal layer has defined values for d/p and d·Δn/λ that respectively fall in the foregoing ranges, i.e., the values according to the maximum applied effective voltage on the first and second electrodes, and that have been set by taking into account the inclined alignment of the liquid crystal molecules in the vicinity of the substrates under applied voltage. As a result, it is possible to suppress the quenching pattern to a such degree as to be unrecognizable for a user, thereby realizing a liquid crystal display device capable of realizing brighter display with higher display quality, compared with a device in which the quenching pattern is recognized. Here, the quenching pattern that can be reduced in the present invention is a quenching pattern that generates on the electrodes within picture elements.

For a fuller understanding of the nature and advantages of the invention, reference should be made to the ensuing detailed description taken in conjunction with the accompanying drawings.

DESCRIPTION OF THE EMBODIMENTS

Figure 1:
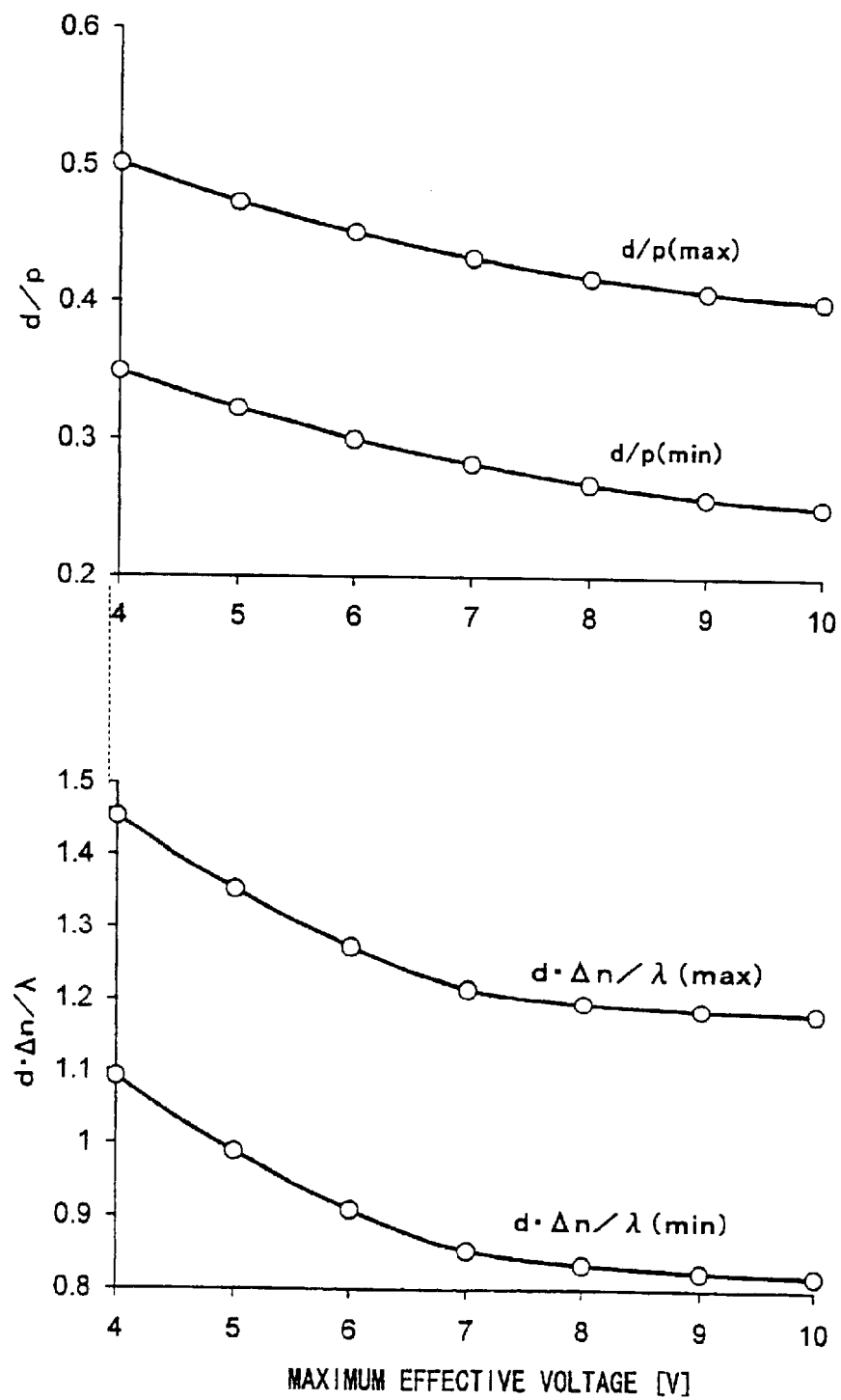
FIG. 1 represents graphs showing (i) a numerical range of d/p and (ii) a numerical range of d·Δn/λ with respect to maximum effective voltage in accordance with one embodiment of the present invention.
Figure 2:
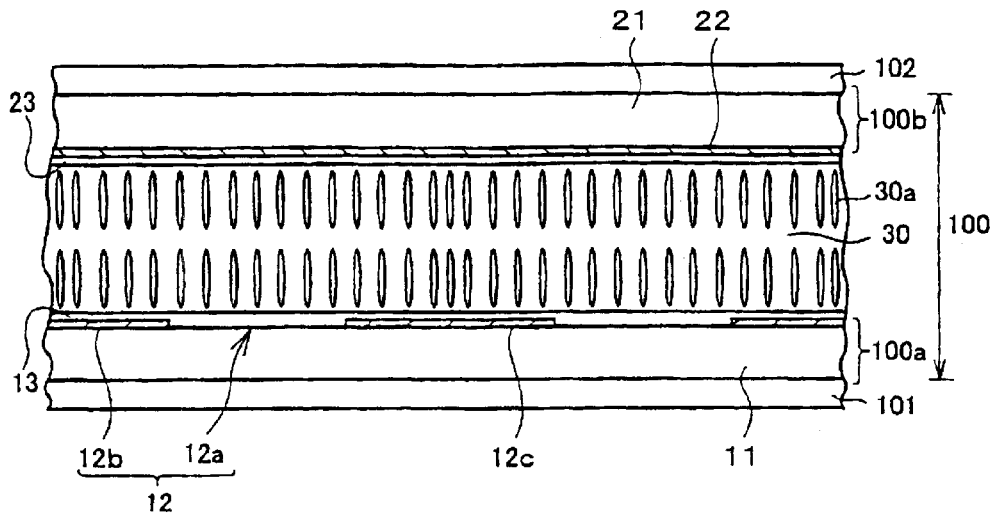
FIG. 2 is a cross-sectional view schematically showing a main part of a liquid crystal display device under no applied voltage.

The following will explain an embodiment of the present invention with reference to FIGS. 1 through 50. A liquid crystal display device in accordance with the present embodiment does not generate a quenching pattern in spite of its high area-transmission-intensity, and thereby produces high quality display. As shown in FIG. 2, the liquid crystal display device is provided with a liquid crystal cell 100 of a vertical alignment mode, and polarization plates 101 and 102 that are respectively disposed on both sides of the liquid crystal cell 100.

The liquid crystal cell 100 includes an active matrix substrate 100a such as a thin film transistor (TFT) substrate (hereinafter referred to as "thin film transistor (TFT) substrate"), a counter substrate 100b such as a color filter substrate (hereinafter also referred to as "color filter substrate"), and a liquid crystal layer 30 interposed between the TFT substrate 100a and the counter substrate 100b. Note that, the TFT substrate 100a and the counter substrate 100b correspond to first and second substrates, respectively, as recited in the claims.

The liquid crystal layer 30 is made of a material prepared by adding a chiral dopant to a nematic liquid crystal material having a negative dielectric anisotropy. Further, the amount of chiral dopant added is set so that d/p of the liquid crystal layer 30 falls within a numerical range to be described later, and that d·Δn/λ of the liquid crystal layer 30 falls within a numerical range to be described later.

Vertical alignment films 13 and 23 are respectively provided on the surfaces of the TFT substrate 100a and the counter substrate 100b facing the liquid crystal layer 30. With the vertical alignment films 13 and 23, liquid crystal molecules 30a in the liquid crystal layer 30 are vertically aligned with respect to the surfaces of the vertical alignment films 13 and 23 when no voltage is applied to the liquid crystal layer 30, as in the state shown in FIG. 2. Here, the liquid crystal layer 30 is in a vertically aligned state.

Note that, depending on the type of the vertical alignment films 13 and 23 and the type of the liquid crystal material, the liquid crystal molecules 30a in the liquid crystal layer 30 in the vertically aligned state may be slightly tilted with respect to normal to the surfaces of the vertical alignment films 13 and 23 (substrate surfaces). In general, however, the term "vertically aligned state" is referred to whenever the liquid crystal molecules 30a are aligned substantially vertically to the surfaces of the vertical alignment films 13 and 23; namely, a state where a liquid crystal molecular axis (also called as "axial direction") of the liquid crystal molecules 30a is aligned at an angle of approximately 85 degrees through 90 degrees with respect to the surfaces of the vertical alignment films 13 and 23.

The TFT substrate 100a of the liquid crystal cell 100 includes a transparent substrate (glass substrate, for example) 11, a picture element electrode (first electrode) 12 formed on a surface of the transparent substrate 11, and the vertical alignment film 13 formed on the surface of the TFT substrate 100a facing the liquid crystal layer 30. On the other hand, the counter substrate 100b includes a transparent substrate (glass substrate, for example) 21, a counter electrode (second electrode) 22 formed on a surface of the counter substrate 11, and the vertical alignment film 23 formed on the surface of the counter substrate 100b facing the liquid crystal layer 30. The aligned state of the liquid crystal layer 30 in each picture element changes in response to the voltage applied to the picture element electrode 12 and the counter electrode 22 facing each other via the liquid crystal layer 30 in between. Display is carried out by utilizing the phenomenon in which the polarizing state and the quantity of light that passes through the liquid crystal layer 30 change in accordance with a change in aligned state of the liquid crystal layer 30.

Note that, as used herein, a portion of the liquid crystal display device that corresponds to a "picture element," which is the minimum unit of display, is hereinafter referred to as a "picture element region." In a color liquid crystal display device, "picture elements" of R, G, and B correspond to one "pixel." In an active matrix liquid crystal display device, the picture element region is defined by the picture element electrode and the counter electrode opposite the picture element electrode. Further, in a simple matrix liquid crystal display device to be described later, the picture element region is defined by a region where stripe column electrodes cross stripe row electrodes orthogonal to each other. Note that, in the strict sense, in an arrangement where a black matrix is provided, an area corresponding to an opening of the black matrix corresponds to the picture element region, among the area to which a voltage is applied in accordance with a state to be displayed.

As a preferred example of the liquid crystal cell 100, the following will explain in detail a case where a plurality of separated electrodes (sub pixels) are formed in one picture element region on the side of one of the substrates (100a), whereby a closed region is formed with respect to an electric field, and the alignment is controlled using an inclined electric field generated from the edges of the electrodes.

Figure 3:
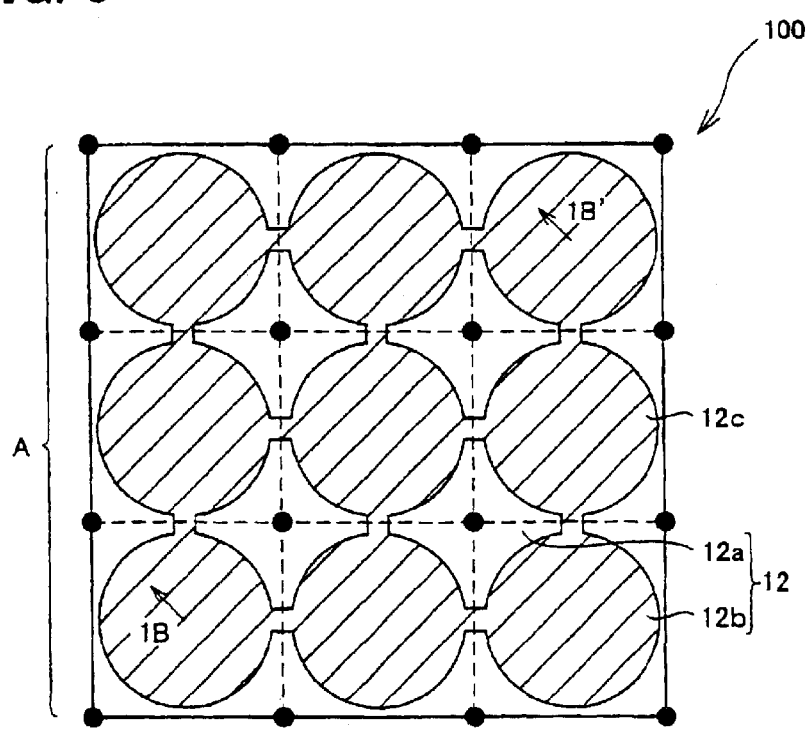
FIG. 3 is a top view of the liquid crystal display device viewed in a direction normal to the substrate.

Specifically, the picture element electrode 12 is made from a conductive film (ITO film, for example). As shown in FIG. 3, a plurality of openings are formed in the picture element electrode 12, for example, by removing the conductive film. Note that, FIG. 3 is a plan view (top view) of the liquid crystal cell 100 of the liquid crystal display device viewed from a direction normal to the substrate. FIG. 2 is a cross-sectional view taken along line 1B–1B' of FIG. 3. Hereinafter, a portion where the conductive film remains (portion except the openings 12a) is referred to as a solid section 12b. The openings 12a are formed in each picture element electrode 12, whereas the solid section 12b is basically a single continuous sheet of conductive film.

In the present embodiment, the openings 12a are arranged so that the centers of the respective openings 12a form a square lattice, and four of the openings 12a whose centers are positioned on four lattice points that form a unit lattice substantially surround the solid section (hereinafter referred to as "unit solid section") 12c, which is substantially circular in shape. Each opening 12a has four sides (edges) each having a quadrant arc shape, and is formed into a substantially star shape having a four-fold axis of symmetry at its center.

Note that, in order to obtain stable alignment over the entire area of the picture element region A, the unit lattice is preferably formed so that it occupies edge portions of the picture element electrode 12 as well. Thus, as shown in FIG. 3, the edge portions of the picture element electrode 12 is preferably patterned into a shape corresponding to approximately a half of the opening 12a (at the sides of the picture element electrode 12) and approximately a quarter of the opening 12a (at the corners the picture element electrode 12). On the other hand, the openings 12a positioned at the central portion of the picture element electrode 12 (four openings 12a whose centers are positioned on four lattice points that form a unit lattice so as to surround the unit solid section 12c) have substantially the same shape and the same size. The unit solid sections 12c each positioned in the unit lattice formed with the opening 12a are substantially circular in shape and have substantially the same shape and the same size. Adjacent ones of the unit solid sections 12c are connected with one another, so as to make up the solid section 12b which substantially serves as a single conductive film.

When a voltage is applied across the counter electrode 22 and the picture element electrode 12 as arranged above, the edge portions of the openings 12a generate an inclined electric field so as to form a plurality of liquid crystal domains each having a radially inclined alignment. The liquid crystal domain is formed for a region corresponding to each opening 12a and for a region corresponding to each unit solid section 12c.

In the liquid crystal cell 100 as arranged above, when the picture element electrode 12 and the counter electrode 22 have the same potential (when no voltage is applied to the liquid crystal layer 30), the liquid crystal molecules 30a within the picture element region are aligned vertically to the surfaces of both the substrates 100a and 100b, as shown in FIG. 2.

Figure 4:
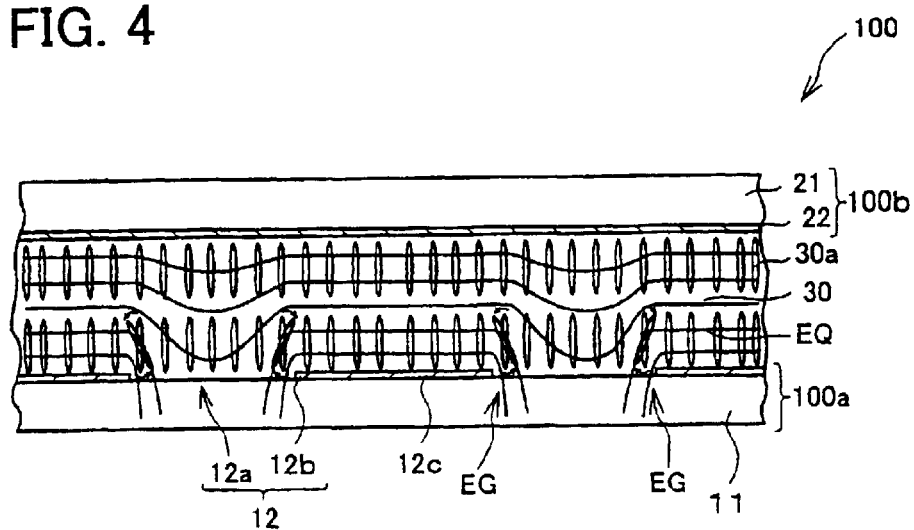
FIG. 4 is a drawing of a liquid crystal cell of the liquid crystal display device, schematically showing a state (ON initial state) where the alignment of liquid crystal molecules in a liquid crystal layer starts changing in response to an applied voltage to the liquid crystal layer.

On the other hand, when a voltage is applied to the liquid crystal layer 30, a potential gradient, which is represented by equipotential lines EQ (orthogonal to the electric field line), is formed in the liquid crystal layer 30, as shown in FIG. 4. The equipotential lines EQ in the liquid crystal layer 30 are parallel to the surfaces of the solid section 12b and the counter electrode 22 in an area between the solid section 12b of the picture element electrode 12 and the counter electrode 22. On the other hand, in an area corresponding to the opening 12c of the picture element electrode 12, the equipotential lines EQ drop towards the opening 12a in the liquid crystal layer 30. That is, an inclined electric field is formed in the liquid crystal layer 30 on an edge portion (peripheral portion of the opening 12a and boundary portion between the opening 12a and the solid section 12b) EG of the opening 12a, as represented by the inclined equipotential lines EQ in FIG. 4.

Figure 5:
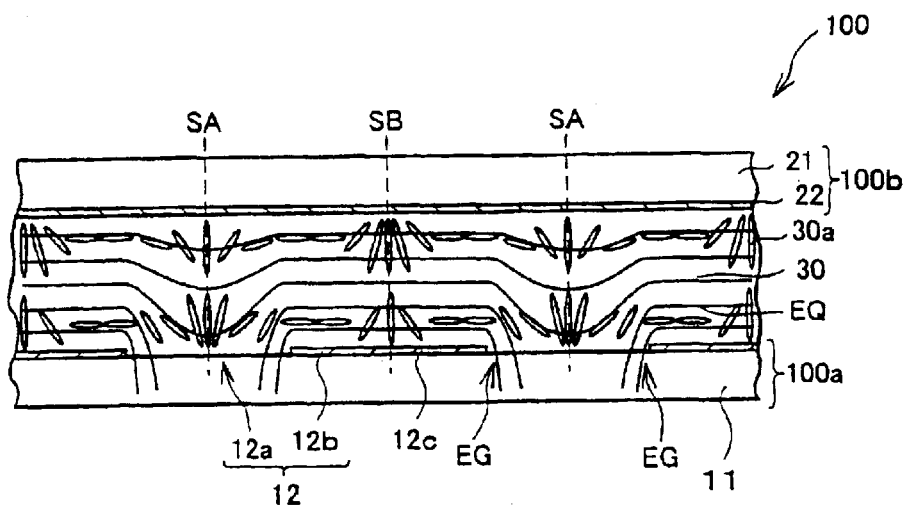
FIG. 5 is a drawing of the liquid crystal cell of the liquid crystal display device, schematically showing a steady state where the alignment of liquid crystal molecules has changed in response to the applied voltage to the liquid crystal layer.

Here, the liquid crystal molecules 30a having a negative dielectric anisotropy are acted upon by a torque that causes the axial direction of the liquid crystal molecules 30a to align itself parallel to the equipotential lines EQ (perpendicular to the electric field line). Accordingly, the liquid crystal molecules 30a on the edge portion EG are tilted (rotated) in a clockwise direction on the right side of the edge portion EG and in a counterclockwise direction on the left side of the edge portion EG, as indicated by the arrows in FIG. 4. As a result, the liquid crystal molecules 30a in the liquid crystal layer 30 are aligned parallel to the equipotential lines EQ, except at the central portion of the unit solid section 12c and the central portion of the opening 12a, as shown in FIG. 5. Note that, FIG. 4 schematically shows a state where the alignment of the liquid crystal molecules 30a has started to change in accordance with an applied voltage to the liquid crystal layer 30 (ON initial state), whereas FIG. 5 schematically shows a state where the aligned state of the liquid crystal molecules 30a in response to the applied voltage has reached a steady state.

Figure 6:
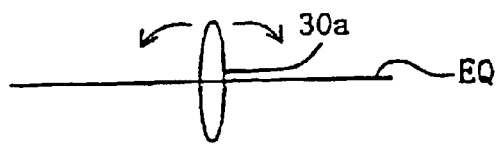
FIG. 6 is a view schematically showing a relationship between an equipotential line and alignment of a liquid crystal molecule when the equipotential line is orthogonal to the axial direction of the liquid crystal molecule.

More specifically, as shown in FIG. 6, when an electric field as represented by the equipotential line EQ perpendicular to the axial direction of the liquid crystal molecule 30a generates, the liquid crystal molecule 30a is acted upon by a torque to tilt clockwise or counterclockwise with equal probability in either direction. Thus, the liquid crystal layer 30, which is interposed between the electrodes of the parallel-plate structure facing each other, contains liquid crystal molecules 30a that are acted upon by a clockwise torque and liquid crystal molecules 30a that are acted upon by a counterclockwise torque. This may prevent the liquid crystal layer 30 from smoothly aligning itself to an aligned state in accordance with an applied voltage.

Figure 7:
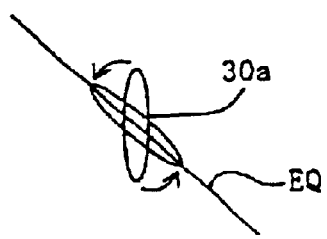
FIG. 7 is a view schematically showing a relationship between an equipotential line and alignment of a liquid crystal molecule when the equipotential line is inclined with respect to the axial direction of the liquid crystal molecule.

In the present embodiment, however, an inclined electric field is formed on the edge portion EG. With the electric field as represented by the equipotential line EQ which is inclined with respect to the axial direction of the liquid crystal molecule 30a (inclined electric field), the liquid crystal molecules 30a tilt in a direction (counterclockwise in FIG. 7) that requires less tilting to be parallel to the equipotential line EQ, as shown in FIG. 7.

Figure 8:
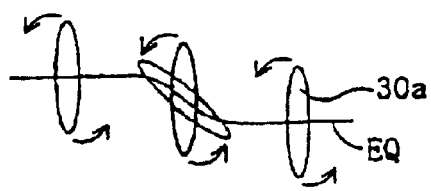
FIG. 8 is a view illustrating a relationship between an equipotential line and alignment of liquid crystal molecules, schematically showing (a) a liquid crystal molecule aligned by an electric field whose equipotential line is inclined with respect to the axial direction of the liquid crystal molecule and (b) liquid crystal molecules aligned by an electric field whose equipotential line is perpendicular to the axial direction of the liquid crystal molecules so as to conform to the liquid crystal molecule (a).
Figure 9:
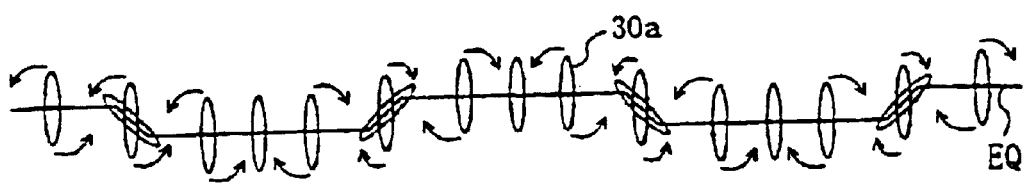
FIG. 9 is a view schematically showing a relationship between an equipotential line and alignment of liquid crystal molecules when an electric field whose equipotential line forms continuous irregularities is applied.

On the other hand, the liquid crystal molecule 30a positioned at a portion where an electric field as represented by the equipotential line EQ perpendicular to the axial direction of the liquid crystal molecule 30a tilts in the same direction as the liquid crystal molecule 30a that is positioned on the inclined equipotential line EQ, so as to have a continuous (uniform) alignment with this liquid crystal molecule 30a, as shown in FIG. 8. Thus, as shown in FIG. 9, when an electric field is applied whose equipotential lines EQ form continuous irregularities, the liquid crystal molecule 30a that is positioned on a flat portion of the equipotential line EQ aligns in such a direction that the direction of alignment conforms to the alignment direction regulated by the liquid crystal molecule 30a that is positioned on a portion of the equipotential line EQ that is continuous from the continuous portion and that is inclined with respect to the liquid crystal molecules 30a. Note that, as used herein, "positioned on an equipotential line EQ" means "positioned within an electric field represented by equipotential lines EQ." Thus, stabilization of the alignment direction starts from the liquid crystal molecule 30a positioned on the inclined portion of the equipotential line EQ, and proceeds through the liquid crystal molecules 30a at the central portion of the solid section and toward the liquid crystal molecules 30a at the central position of the opening 12a.

In the region above the opening 12a, the liquid crystal molecules 30a positioned in the vicinity of the center of the opening 12a are influenced, to substantially the same extent, by the alignments of the liquid crystal molecules 30a on the opposite edge portions EG across the opening 12a. Thus, as shown in FIG. 5, the liquid crystal molecules 30a at the central portion of the opening 12a maintains its vertically aligned state with respect to the equipotential line EQ. On the other hand, the liquid crystal molecules 30a that are off the center of the opening 12a are tilted under the influence of the alignments of the liquid crystal molecules 30a on the edge portions EG of the respective sides, so as to form an inclined alignment that is symmetrical with respect to the center SA of the opening 12a.

Likewise, in a region above the unit solid section 12c substantially surrounded with the openings 12a, the liquid crystal molecules 30a in the corresponding region of the unit solid section 12c are influenced by the alignments of the liquid crystal molecules 30a on the edge portions EG of the opening 12a. Further, the liquid crystal molecules 30a positioned in the vicinity of the center of the unit solid section 12c are influenced, to substantially the same extent, by the alignments of the liquid crystal molecules 30a on the opposite edge portions EG across the unit solid section 12c. As a result, the liquid crystal molecules 30a on the unit solid section 12c form an inclined alignment that is symmetrical with respect to the center SB of the unit solid section 12c (corresponding to the center of the unit lattice formed by the openings 12a).

Therefore, as described above, a change in aligned state is set off by the liquid crystal molecules 30a positioned on the inclined equipotential lines EQ, and proceeds until the liquid crystal molecules 30a within the picture element region reach a steady state. The alignments of the liquid crystal molecules 30 in a steady state are schematically shown in FIG. 5 by the cross section of the liquid crystal layer.

Figure 10:
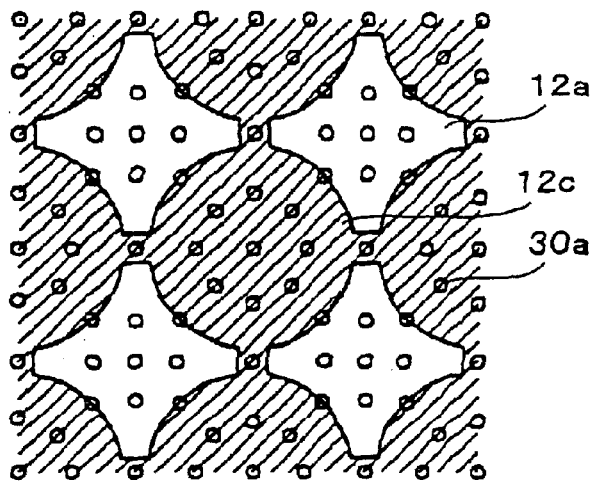
FIG. 10 is a view schematically showing alignment directions of the liquid crystal molecules when the liquid crystal molecules are viewed in a direction normal to the substrate under no applied voltage.
Figure 11:
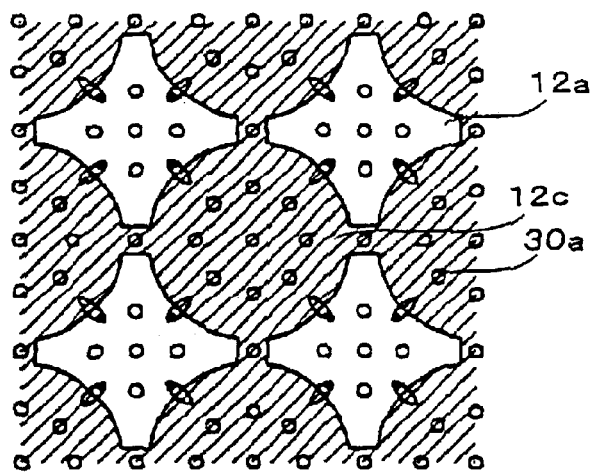
FIG. 11 is a view schematically showing alignment directions of the liquid crystal molecules when the liquid crystal molecules are viewed in a direction normal to the substrate in the ON initial state.
Figure 12:
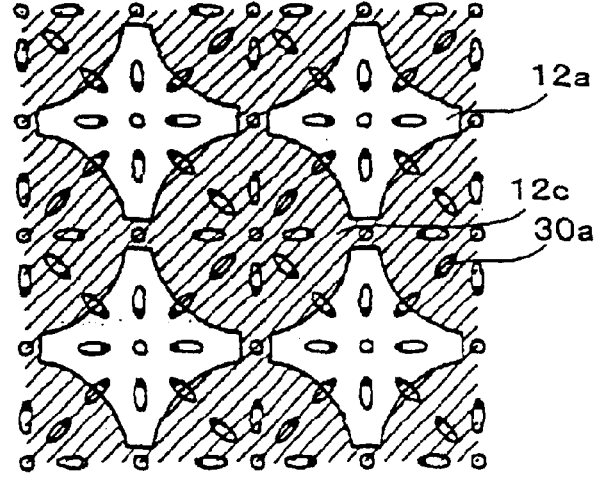
FIG. 12 is a view schematically showing alignment directions of the liquid crystal molecules when the liquid crystal molecules are viewed in a direction normal to the substrate in the steady state.

Meanwhile, the aligned state of the liquid crystal layer 30 in an in-plane direction of the substrate changes in response to an applied voltage in the manner shown in FIGS. 10 through 12. Namely, under no applied voltage to the liquid crystal layer 30, the aligned direction of the liquid crystal molecules 30a in the picture element region are regulated by the vertical alignment films 13 and 23, so that the liquid crystal molecules 30 are in a vertically aligned state, as shown in FIG. 10. Note that, in the drawings showing the aligned state of the liquid crystal molecules 30a as viewed from a direction normal to the substrate, the black end of an ellipsoid representing the liquid crystal molecule 30a indicates that the liquid crystal molecule 30a is tilted so that the substrate on which the picture element electrode 12 having the openings 12a is provided is closer to the black end than the other end.

When an electric field represented by the equipotential lines EQ shown in FIG. 4 is generated by the electric field applied across the liquid crystal layer 30, the liquid crystal molecules 30a having a negative dielectric anisotropy are acted upon by a torque that causes the axial directions of the liquid crystal molecules to be parallel to the equipotential lines EQ. As described above, the alignments of the liquid crystal molecules 30a under the electric field represented by the equipotential lines EQ perpendicular to the molecular axis of the liquid crystal molecules 30a are not easily changed (tilted or rotated), because the direction of tilting (rotation) of the liquid crystal molecules 30a is not uniquely defined. On the other hand, the alignments of the liquid crystal molecules 30a under the equipotential lines EQ that are inclined with respect to the molecular axis of the liquid crystal molecules 30a are easily changed, because the tilting (rotation) direction is uniquely defined. Thus, as shown in FIG. 11, the liquid crystal molecules 30a start tilting from a portion where the molecular axis of the liquid crystal molecules 30a is tilted with respect to the equipotential lines EQ, namely the edge portions EG of the opening 12a. Then, the surrounding liquid crystal molecules 30a are tilted so as to conform to the alignments of the tilted liquid crystal molecules 30a on the edge portions EG of the opening 12a. As a result, the axial directions of the liquid crystal molecules 30a stabilize in the state shown in FIG. 12. Note that, in the present embodiment, the alignment involves twist because the liquid crystal molecules 30a have a natural twist pitch p. The influence of the twist will be discussed later.

Here, the opening 12a in accordance with the present embodiment has a rotationally symmetrical shape. Thus, the liquid crystal molecules 30a within a picture element region start tilting from the edge portions EG of the opening 12a toward the center of the opening 12a when a voltage is applied. Further, under applied voltage, the alignment-regulating forces exerted on the liquid crystal molecules 30a by the edge portions EG are balanced out in the vicinity of the center SA of the opening 12a. Thus, while the liquid crystal molecules 30a in the vicinity of the center SA of the opening 12a retain its vertically aligned state with respect to the substrate surface, the surrounding liquid crystal molecules 30a are aligned in a radially inclined manner around the liquid crystal molecules 30a in the vicinity of the center SA of the opening 12a. The aligned state of these surrounding liquid crystal molecules 30a shows a continuous (smooth) change.

As a result, when viewed from a direction vertical to the display surface of the liquid crystal cell 100 (vertical to the surfaces of the substrates 100a and 100b), the axial directions of the liquid crystal molecules 30a are radially aligned with respect to the center of the opening 12a. Note that, in the present specification, a state where the liquid crystal molecules 30a of the liquid crystal layer 30 are aligned in a radially inclined manner is referred to as a "radially inclined alignment." Further, a portion of the liquid crystal layer having a radially inclined alignment around any given center is referred to as a liquid crystal domain.

Likewise, in a portion corresponding to the unit solid section 12c, the liquid crystal molecules 30a also have a radially inclined alignment, forming a liquid crystal domain in which the liquid crystal molecules 30a have a radially inclined alignment. More specifically, the liquid crystal molecules 30a are tilted so as to conform to the alignments of the liquid crystal molecules 30a that are tilted by the inclined electric field generated at the edge portions EG of the opening 12a. Under applied voltage, the alignment regulating forces exerted on the liquid crystal molecules 30a by the edge portions EG balance out in the vicinity of the center SB of the unit solid section 12c. Consequently, when a voltage is applied, the liquid crystal molecules 30a in the vicinity of the center SB of the unit solid section 12c retain its vertically aligned state with respect to the substrate surface; while the surrounding liquid crystal molecules 30a are aligned in such a manner that the in-plane component of the alignment directions is radially aligned around the liquid crystal molecules 30a in the vicinity the center SB of the unit solid section 12c so that component of the normal direction is inclined. In this state, the aligned state of the surrounding liquid crystal molecules 30a shows a continuous (smooth) change.

As described above, the picture element electrode 12 of the liquid crystal display device in accordance with the present embodiment has a plurality of openings 12a. In response to an applied voltage, the picture element electrode 12 generates such an electric field in the picture element region in the liquid crystal layer 30 that the electric field is represented by equipotential lines EQ having an inclined portion. The liquid crystal molecules 30a having a negative dielectric anisotropy within the liquid crystal layer 30 are in a vertically aligned state under no applied voltage. When a voltage is applied to the picture element electrode 12, a change in alignment of the liquid crystal molecules positioned on the inclined equipotential lines EQ triggers a change in alignment direction of the liquid crystal molecules 30a, thereby forming the liquid crystal domain of a stable radially inclined alignment for the opening 12a and for the solid section 12b. Here, in response to an applied voltage to the liquid crystal layer 30, the alignments of the liquid crystal molecules in the liquid crystal domain changes. This enables the liquid crystal display device to change its display state in accordance with the applied voltage.

The radially inclined alignment in the liquid crystal domain formed on the unit solid section 12c and the radially inclined alignment in the liquid crystal domain formed on the opening 12a are continuous, and the radially inclined alignment in either liquid crystal domain conforms to the alignments of the liquid crystal molecules 30a on the edge portions EG of the opening 12a. Accordingly, the liquid crystal molecules 30a in the liquid crystal domain formed on the opening 12a are aligned in the form of a cone opening upward (open to the substrate 100b), while the liquid crystal molecules 30a formed on the unit solid section 12c are aligned in the form of a cone opening downward (open to the substrate 100a). Thus, the radially inclined alignment in the liquid crystal domain formed on the opening 12a and the radially inclined alignment in the liquid crystal domain formed on the unit solid section 12c are continuous to each other. This eliminates a disclination line (alignment defect) along the boundary of the liquid crystal domains, thereby preventing impairment of display quality caused by the disclination line.

Note that, with the described arrangement of the present embodiment in which the liquid crystal domains each having a radially inclined alignment of the liquid crystal molecules 30a are arranged in the form of a square lattice over the entire picture element region, the probability of existence of the liquid crystal molecules 30a aligned in the respective axial directions assumes rotational symmetry, thereby realizing high quality display without unevenness in every viewing angle direction. Here, to reduce the viewing angle dependency of the liquid crystal domain having a radially inclined alignment, the liquid crystal domain preferably has a high-fold axis of symmetry (preferably two or greater fold axis of symmetry, and more preferably four-fold axis of symmetry). Further, to reduce the viewing angle dependency over the entire picture element region, a plurality of liquid crystal domains formed in the picture element region preferably form an array (square lattice, for example) represented by a combination of units (unit lattice, for example)

with a high-fold axis of symmetry (preferably, a two or greater fold axis of symmetry, and more preferably a four or greater fold axis of symmetry).

In the liquid crystal display device using the liquid crystal cell 100, almost all of the liquid crystal molecules 30a in the liquid crystal layer 30 are in the vertically aligned state under no applied voltage. Thus, in the arrangement where the liquid crystal cell 100 is sandwiched between the polarization plates 101 and 102 as shown in FIG. 2, the incident light enters the liquid crystal cell 100 as linearly polarized light through the polarization plate 101. Since the birefringent effect does not occur in the liquid crystal cell 100, the incident light passes through the liquid crystal cell 100 while substantially maintaining the state of polarization, and reaches the polarization plate 102. Here, the polarization axis of the polarization plate 101 and the polarization axis of the polarization plate 102 are arranged to cross each other at a right angle. Thus, most of the light that passes through the liquid crystal cell 100 is absorbed in the polarization plate 102. As a result, the liquid crystal display device has black display under no applied voltage. Particularly, in the liquid crystal display device of the present embodiment, the liquid crystal molecules 30a in the liquid crystal cell 100 can achieve a substantially complete vertically aligned state for black display. This prevents light leaking almost completely, thereby realizing high contrast display.

On the other hand, under applied voltage, the liquid crystal molecules 30a of the liquid crystal layer 30 are in a radially-inclined alignment state. Thus, in the arrangement where the liquid crystal cell 100 is sandwiched between the polarization plates 101 and 102, the incident light enters the liquid crystal cell 100 as linearly polarized light through the polarization plate 101. Since the birefringent effect occurs in the liquid crystal cell 100, the incident light passes through the liquid crystal cell 100 by changing the state of polarization, and reaches the polarization plate 102. Here, the component of the light that has changed its state of polarization to coincide with the direction of the polarization axis of the polarization plate 102 passes through the polarization plate 102 and leaves the polarization plate 102 to realize white display. Further, a change in applied voltage brings about a change in inclination amount for the radially inclined alignment and a corresponding change in the amount of birefringent effect generated by the inclination. As a result, the quantity of light that emerges from the polarization plate 102 is varied. This realizes gradation display in accordance with the applied voltage.

Further, because of the radially inclined alignment, the probability of existence of the liquid crystal molecules 30a aligned in the respective axial directions assumes rotational symmetry, so that the regions where the liquid crystal molecules 30a are aligned in different directions optically compensate with one another. As a result, no matter which direction a user views the liquid crystal display device, the intensity of emergent light (brightness of picture elements) is substantially the same over the entire picture element region, thereby achieving a large viewing angle.

In the event where the liquid crystal layer does not have a twisted structure, sandwiching the liquid crystal cell 100 between the two polarization plates 101 and 102 whose polarization axes are crossed in a crossed nicole arrangement causes a phenomenon known as a quenching pattern. More specifically, when the liquid crystal molecules 30a are aligned in different directions in the liquid crystal cell 100 as in the radially inclined alignment, the directions of the polarization axes of the polarization plates are related to the respective alignment directions of the liquid crystal molecules 30a under applied voltage in such a manner that the birefringence effect, which is generated in each minute unit region according to the relationship between the polarization directions and the alignment directions, is generated to a different extent in each minute unit region. The differences in birefringence effect between minute unit regions are recognized as differences in luminance (quenching pattern). That is, the phenomenon reduces the number of minute unit regions that can effectively transmit light, thereby decreasing luminance. Note that, the minute unit region refers to a region in which the liquid crystal layer is divided on the molecular level of the liquid crystal parallel to the layer direction of the liquid crystal layer. Specifically, the minute unit region is a column of liquid crystal molecules in the thickness direction of the liquid crystal layer, as shown in FIGS. 33 through 36 to be described later.

In contrast, in the liquid crystal display device in accordance with the present embodiment, d/p of the liquid crystal cell 100 is set in accordance with a maximum applied effective voltage (applied effective voltage for white display) Vmax [V], as given by the following inequity (1).

$d/p$ (min)$\leq d/p \leq d/p$ (max), where $d/p$ (max)=$0.0021 \times (V\text{max})^2 - 0.0458 \times (V\text{max}) + 0.65$, and $d/p$ (min)=$0.0021 \times (V\text{max})^2 - 0.0458 \times (V\text{max}) + 0.50$ \hfill (1).

Note that, d [μm] is the gap of the liquid crystal cell 100, and p [μm] is the natural twist pitch of the liquid crystal (twist amount for unregulated liquid crystal; the length required for twisting the liquid crystal 360 degrees). Here, in the liquid crystal cell 100 in accordance with the present embodiment, p is set by adding a chiral dopant to the liquid crystal.

Further, in the present embodiment, d·Δn/λ of the liquid crystal cell 100 is set in accordance with a maximum applied effective voltage (applied effective voltage for white display) Vmax [V], as given by the following inequity (2).

$d \cdot \Delta n/\lambda$ (min)$\leq d \cdot \Delta n/\lambda \leq d \cdot \Delta n/\lambda$ (max), where $d \cdot \Delta n/\lambda$ (max)=$-0.00026 \times (V\text{max})^3 + 0.016 \times (V\text{max})^2 - 0.2281 \times (V\text{max}) + 2.124$, and $d \cdot \Delta n/\lambda$ (min)=$-0.00026 \times (V\text{max})^3 + 0.016 \times (V\text{max})^2 - 0.2281 \times (V\text{max}) + 1.7603$ \hfill (2).

Note that, Δn is the birefringence anisotropy, and λ [μm] is the wavelength of transmitted light. FIG. 1 shows graphs representing a numerical range for d/p with respect to different values of maximum applied effective voltage and a numerical range for d·Δn/λ with respect to different values of maximum applied effective voltage. Namely, as shown in FIG. 1, d/p and d·Δn/λ are set to satisfy the inequities (1) and (2), respectively, in accordance with the maximum applied effective voltage Vmax.

As a result, in the liquid crystal display device in accordance with the present embodiment, the quenching pattern is invisible, and each minute unit region has the maximum transmission intensity, thereby surely obtaining a liquid crystal display device having remarkably improved display quality.

The inequities (1) and (2) were derived in the following manner. Specifically, by means of simulation and using the liquid crystal display device as arranged above, d·Δn/λ that maximizes the area transmission intensity (normalized value of integration result of transmission intensity in the minute unit regions within the plane, for example, within one picture element) was calculated for each combination of the maximum applied effective voltage Vmax and d/p.

Figure 13:
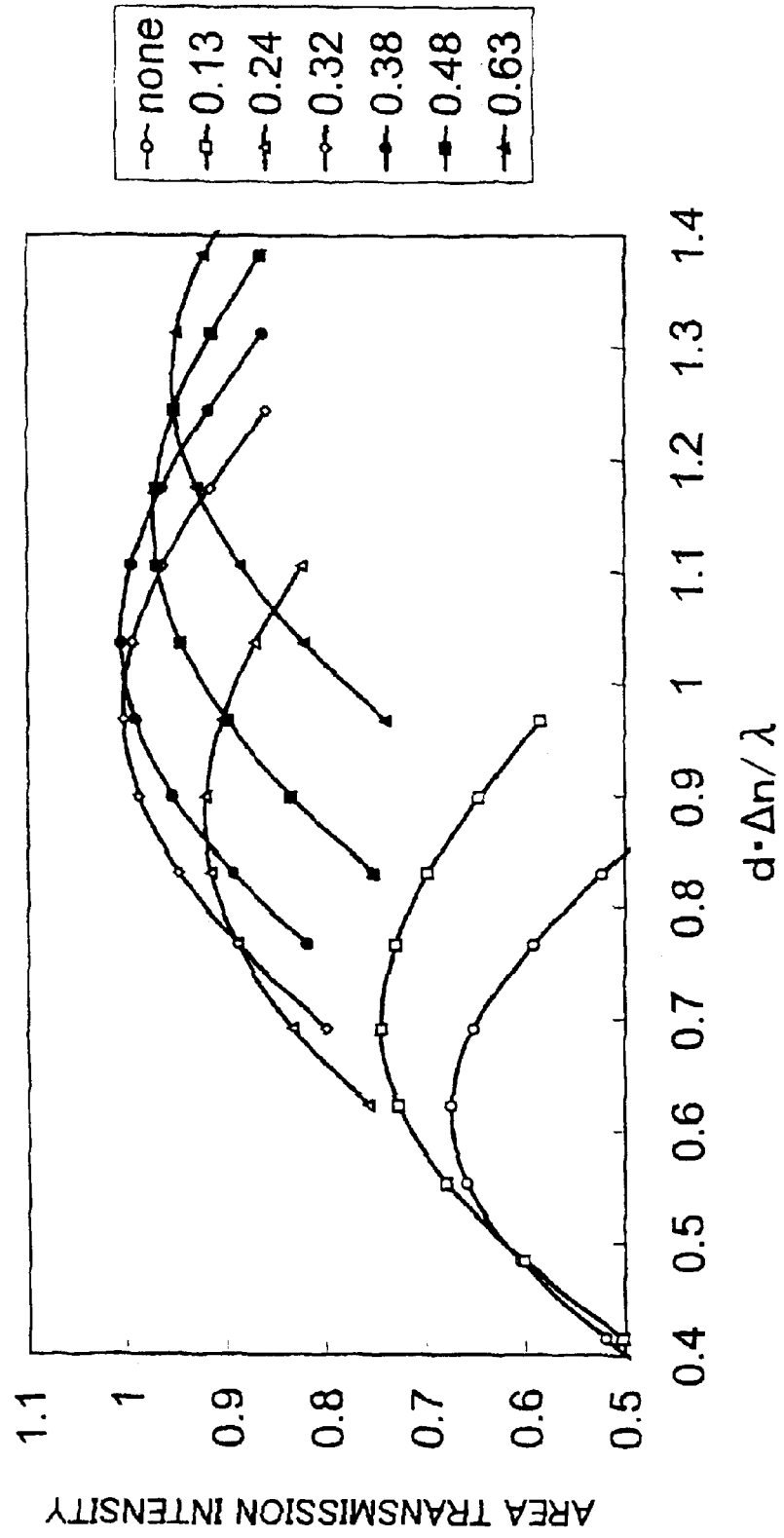
FIG. 13 is a graph showing a relationship between area transmission intensity and d·Δn/λ at each different value of d/p under maximum applied effective voltage of 10 [V].
Figure 14:
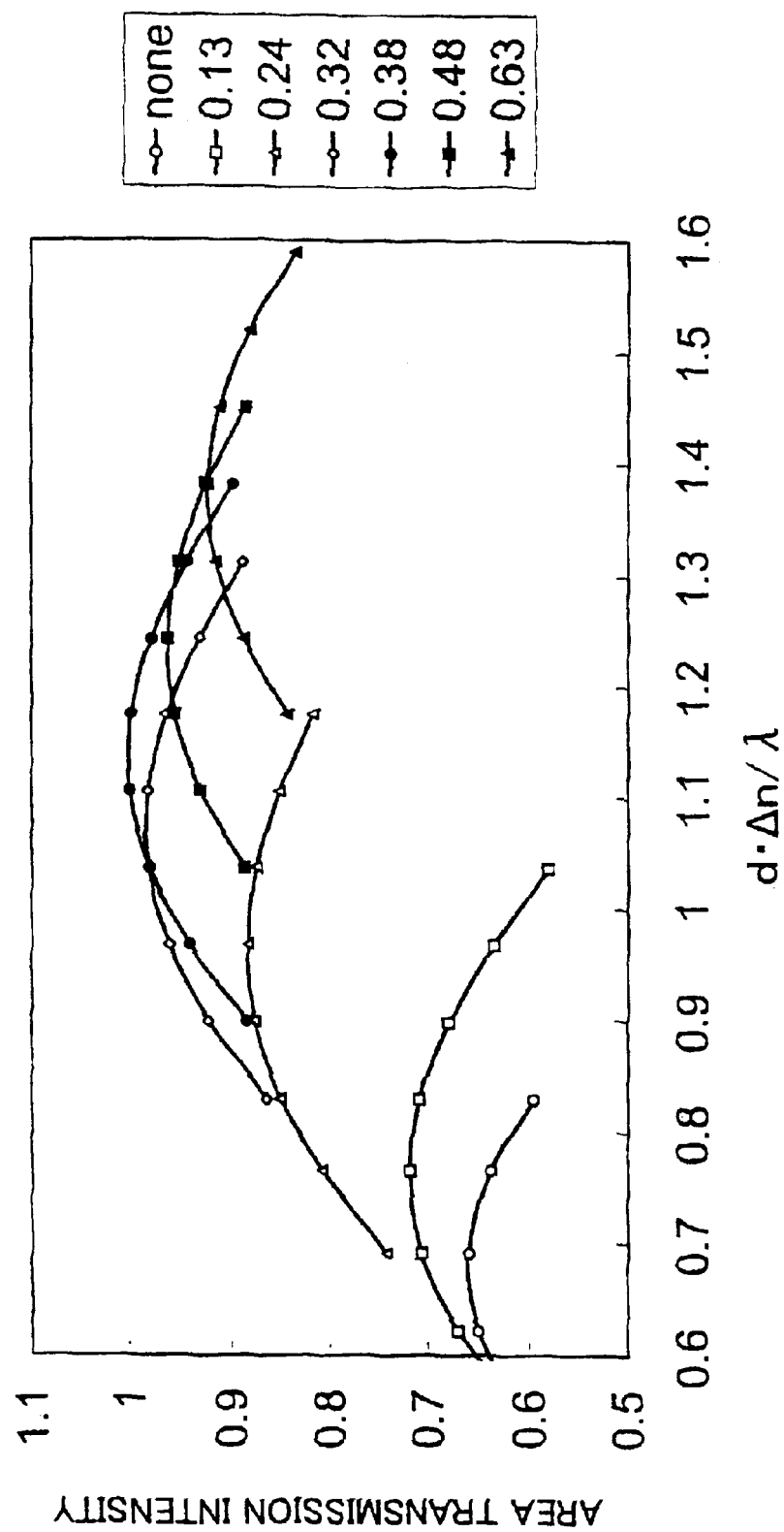
FIG. 14 is a graph showing a relationship between area transmission intensity and d·Δn/λ at each different value of d/p under maximum applied effective voltage of 6 [V].
Figure 15:
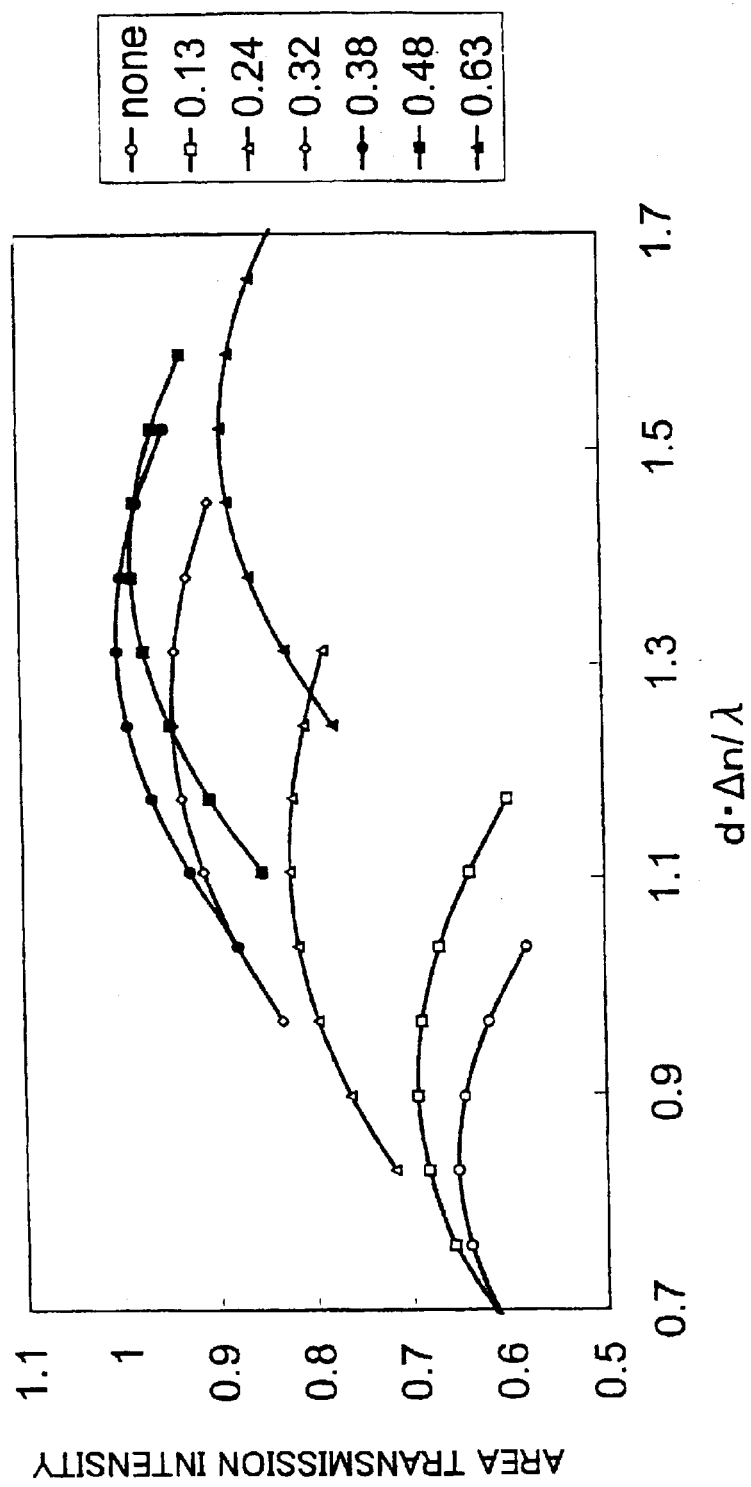
FIG. 15 is a graph showing a relationship between area transmission intensity and d·Δn/λ at each different value of d/p under maximum applied effective voltage of 4 [V].

The result of simulation showed that when the maximum applied effective voltage is 10 [V] for example, the area transmission intensity with respect to each value of d/p varies with d·Δn/λ in the manner shown in FIG. 13. In this case, when d/p=0.38 for example, the maximum area transmission intensity is obtained with d·Δn/λ=1.03. When the maximum applied effective voltage is 6 [V] for example, the area transmission intensity with respect to each value of d/p varies with d·Δn/λ in the manner shown in FIG. 14. In this case, when d/p=0.38 for example, the maximum area transmission intensity is obtained with d·Δn/λ=1.10. Further, when the maximum applied effective voltage is 4 [V] for example, the area transmission intensity with respect to each value of d/p varies with d·Δn/λ in the manner shown in FIG. 15. In this case, when d/p=0.38 for example, the maximum area transmission intensity is obtained with d·Δn/λ=1.31.

Furthermore, using the value of d·Δn/λ that maximizes the area transmission intensity, a transmission intensity distribution in a liquid crystal domain (sub pixel) was calculated by means of simulation to evaluate whether or not a quenching pattern is suppressed to the extent where it cannot be recognized. Note that, in the simulation, the liquid crystal director was calculated by three-dimensional calculation using director-vector equation of motion based on the Eriksen-Leslie theory, and optical calculation was carried out through analysis using Jones matrix.

As an example, under the condition where Vmax=6 [V], and for liquid crystal display devices with d/p=0.13, 0.38, and 0.48 and for a liquid crystal display device in which the liquid crystal does not have a twisted structure, FIGS. 16 through 31 show alignment direction distributions and transmission intensity distributions of the liquid crystal molecules 30a, wherein the alignment direction distributions were measured (i) in the vicinity of the surface of the counter electrode 22, (ii) in the vicinity of the middle of the liquid crystal layer 30, and (iii) in the vicinity of the surface of the picture element electrode 12. Here, d·Δn/λ is set to yield the maximum area transmission intensity for each value of d/p. It should be noted that the above simulation was carried out for combinations of (i) a dielectric anisotropy Δε in a range of −2.5 and −6.5 and (ii) an elastic constant ratio K11/K33 in a range of 0.9 and 2.0. In FIGS. 13 through 31, however, only representative drawings with a dielectric anisotropy Δε of −4 and an elastic constant ratio K33/K11 of 1.1 for the liquid crystal layer 30 are shown as an example among the simulation results.

Figure 16:
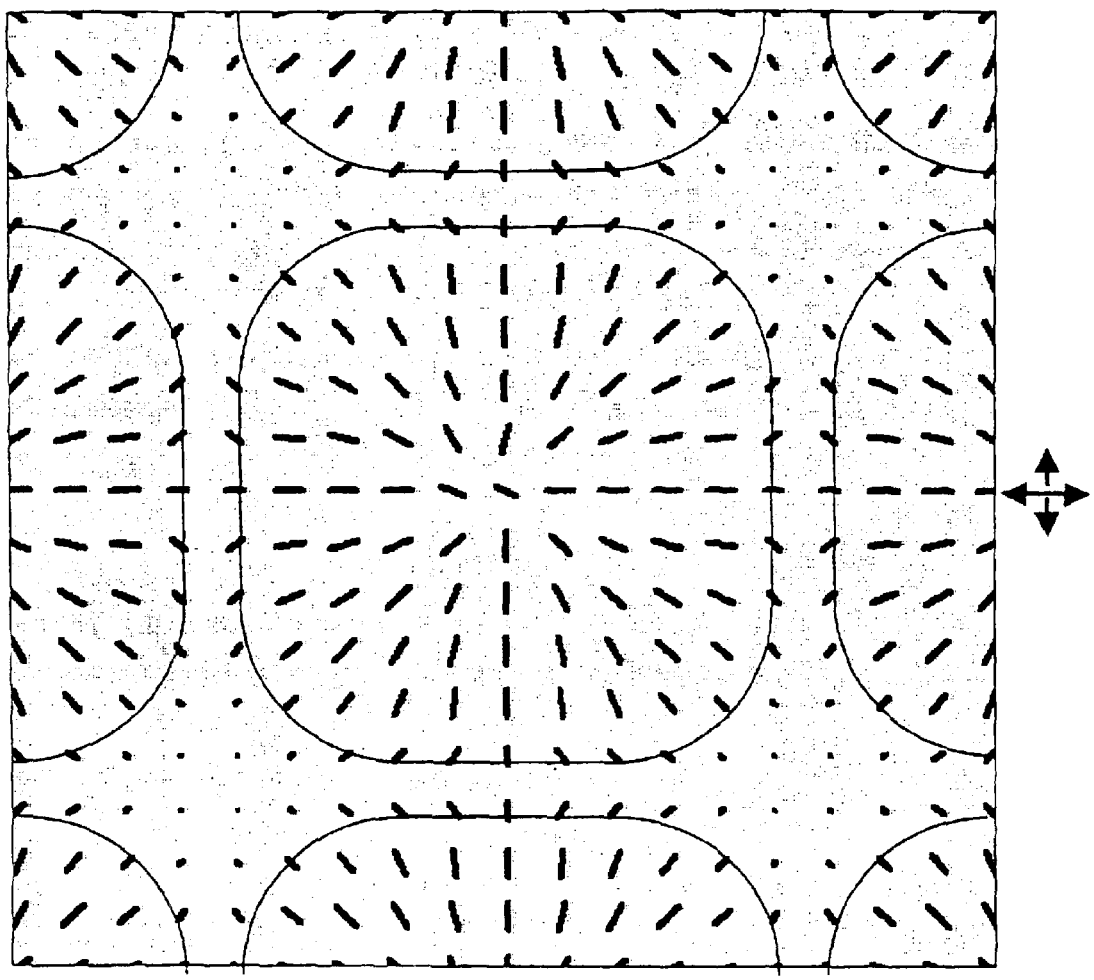
FIG. 16 is a view schematically showing an alignment state of liquid crystal molecules in the vicinity of the surface of the counter electrode in the liquid crystal display device, when pitch p=0.
Figure 17:
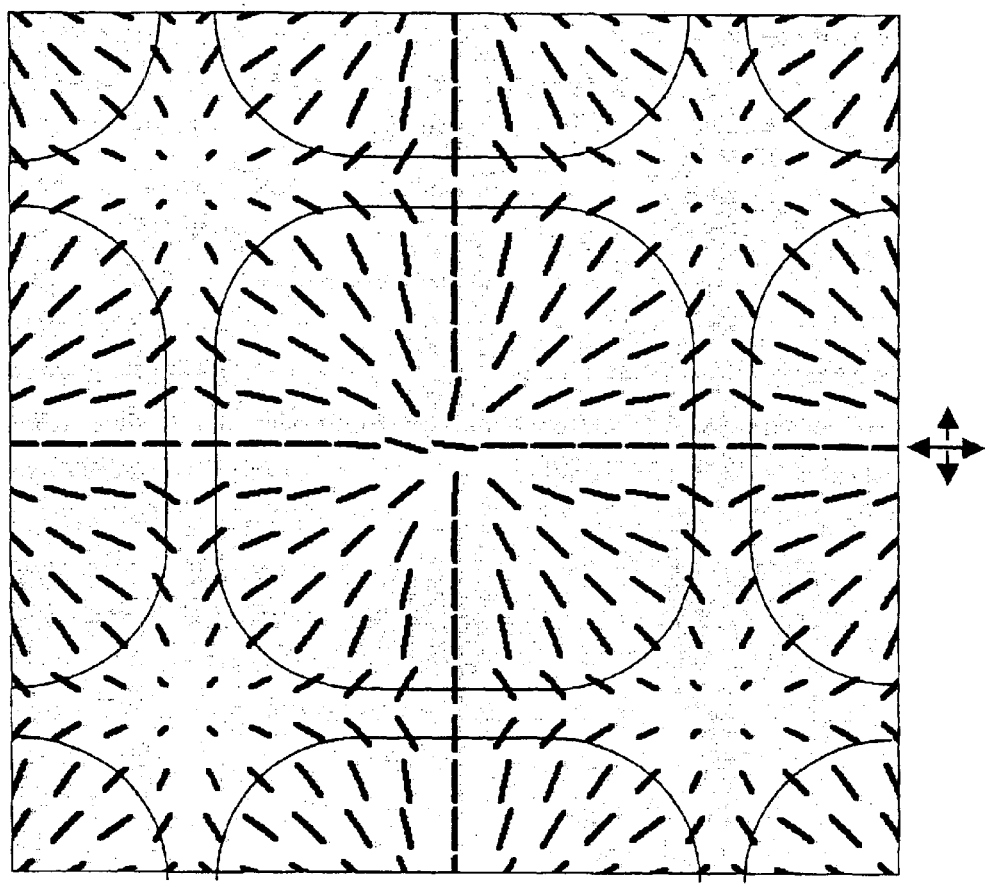
FIG. 17 is a view schematically showing an alignment state of liquid crystal molecules in the vicinity of the middle of the liquid crystal layer in the liquid crystal display device, when pitch p=0.
Figure 18:
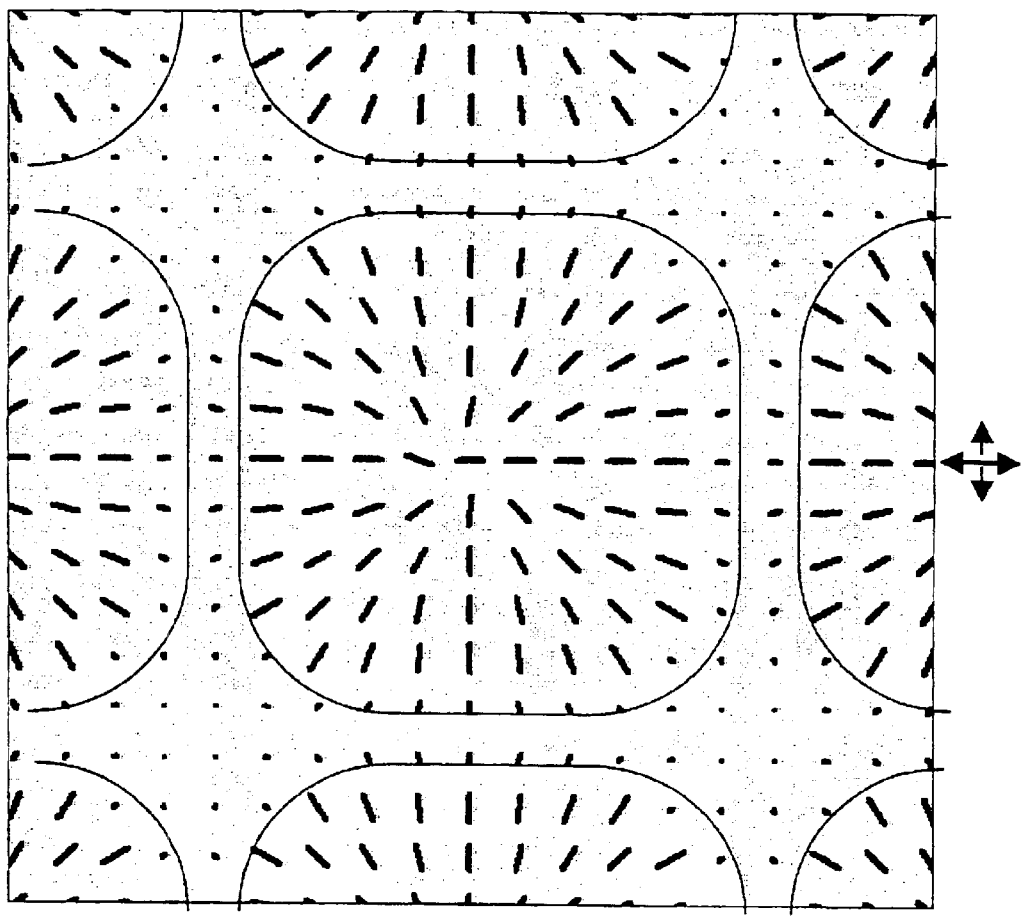
FIG. 18 is a view schematically showing an alignment state of liquid crystal molecules in the vicinity of the surface of the picture element electrode in the liquid crystal display device, when pitch p=0.
Figure 19:
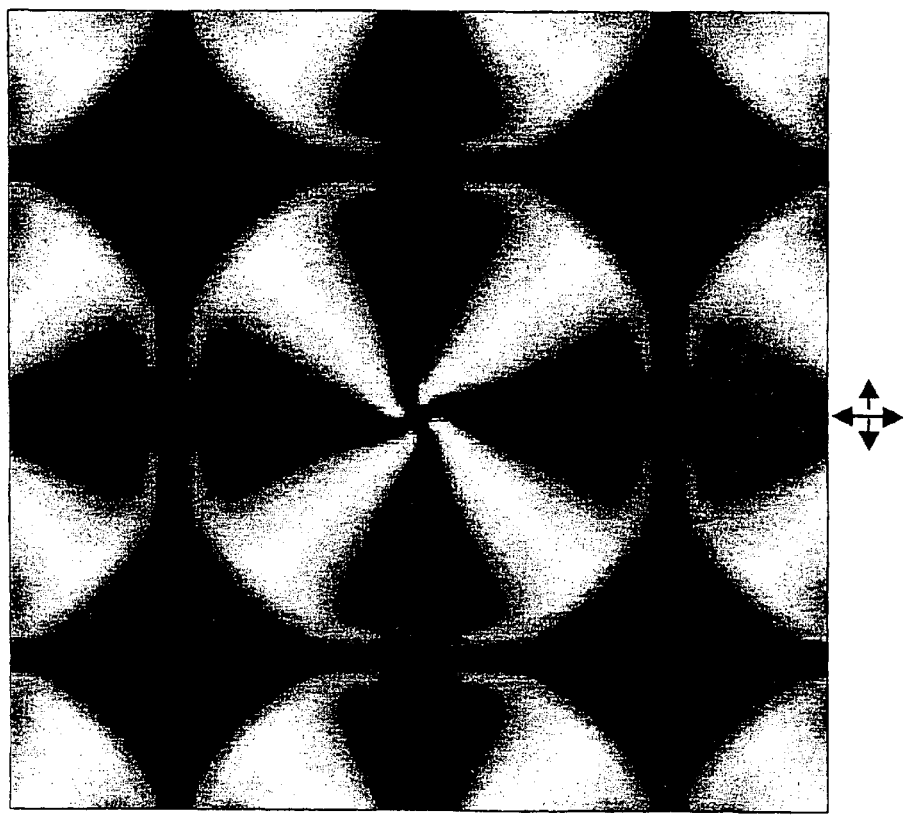
FIG. 19 is a diagram showing a transmission intensity distribution in the liquid crystal display device, when pitch p=0.
Figure 19:
Figure 20:
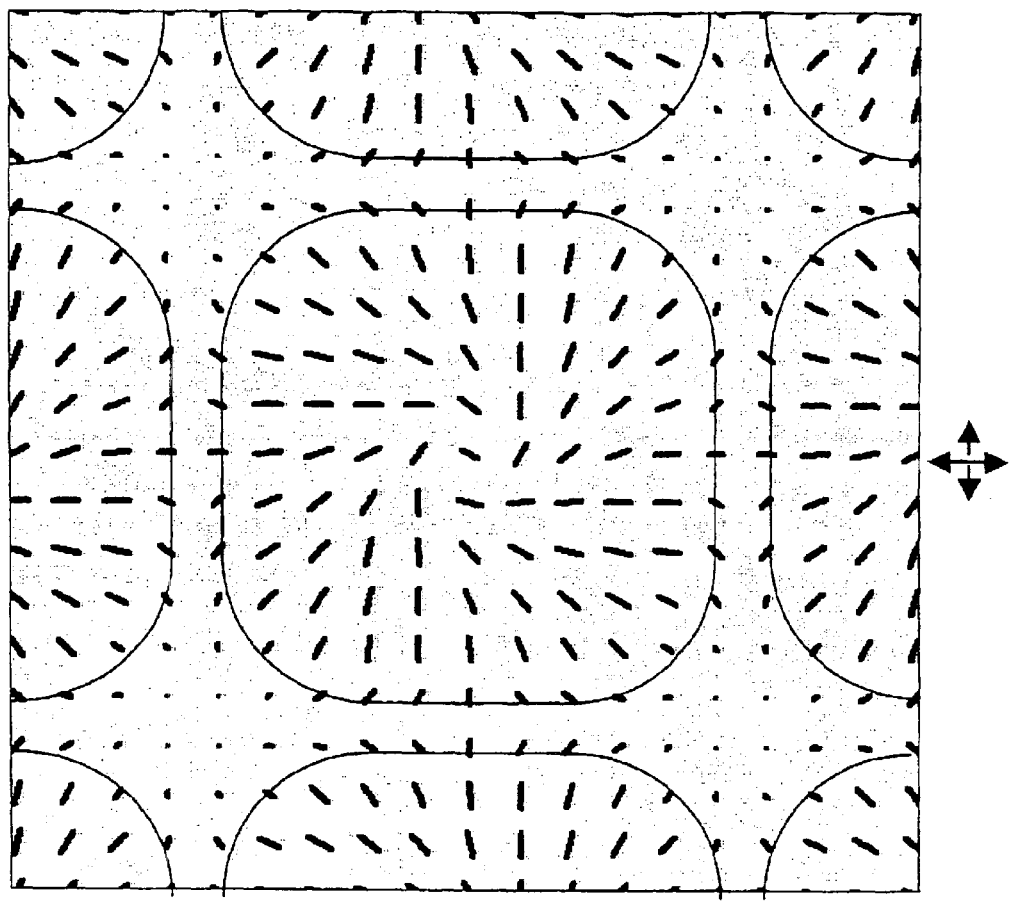
FIG. 20 is a view schematically showing an alignment state of liquid crystal molecules in the vicinity of the surface of the counter electrode in the liquid crystal display device, when d/p=0.13.
Figure 21:
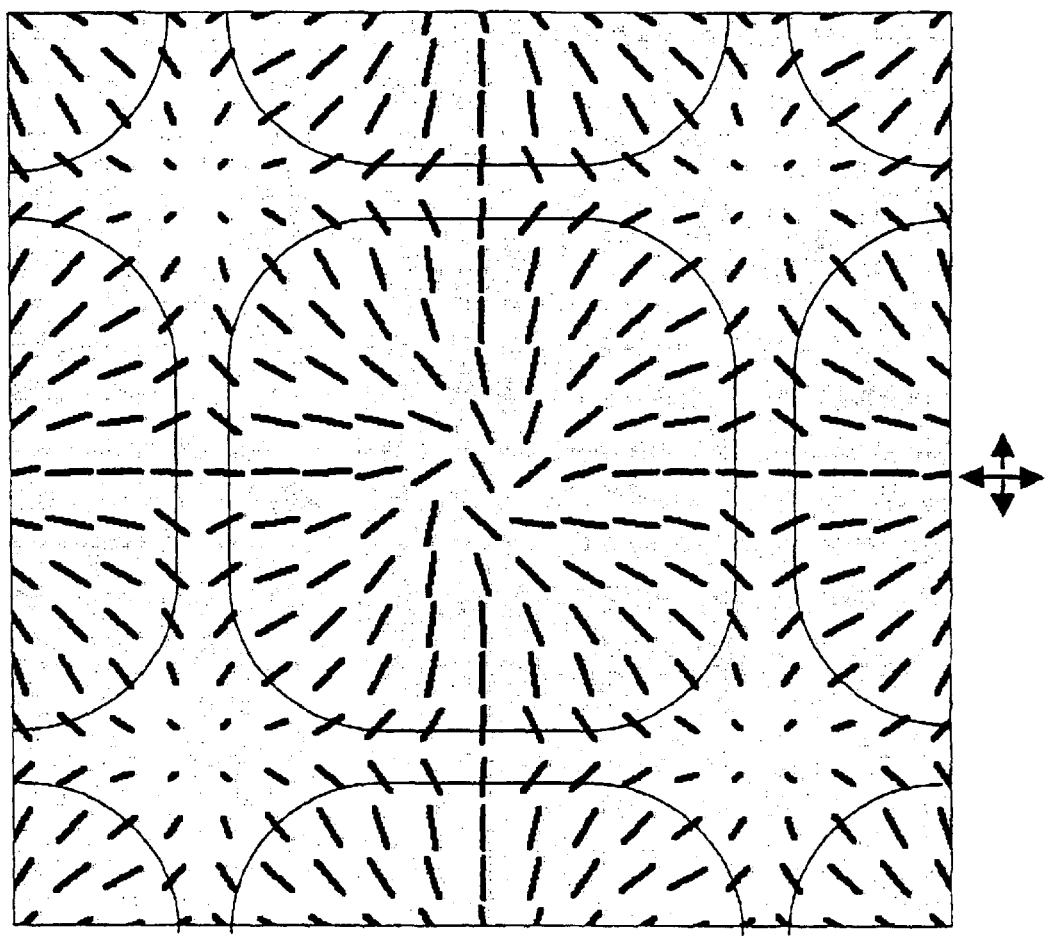
FIG. 21 is a view schematically showing an alignment state of liquid crystal molecules in the vicinity of the middle of the liquid crystal layer in the liquid crystal display device, when d/p=0.13.
Figure 22:
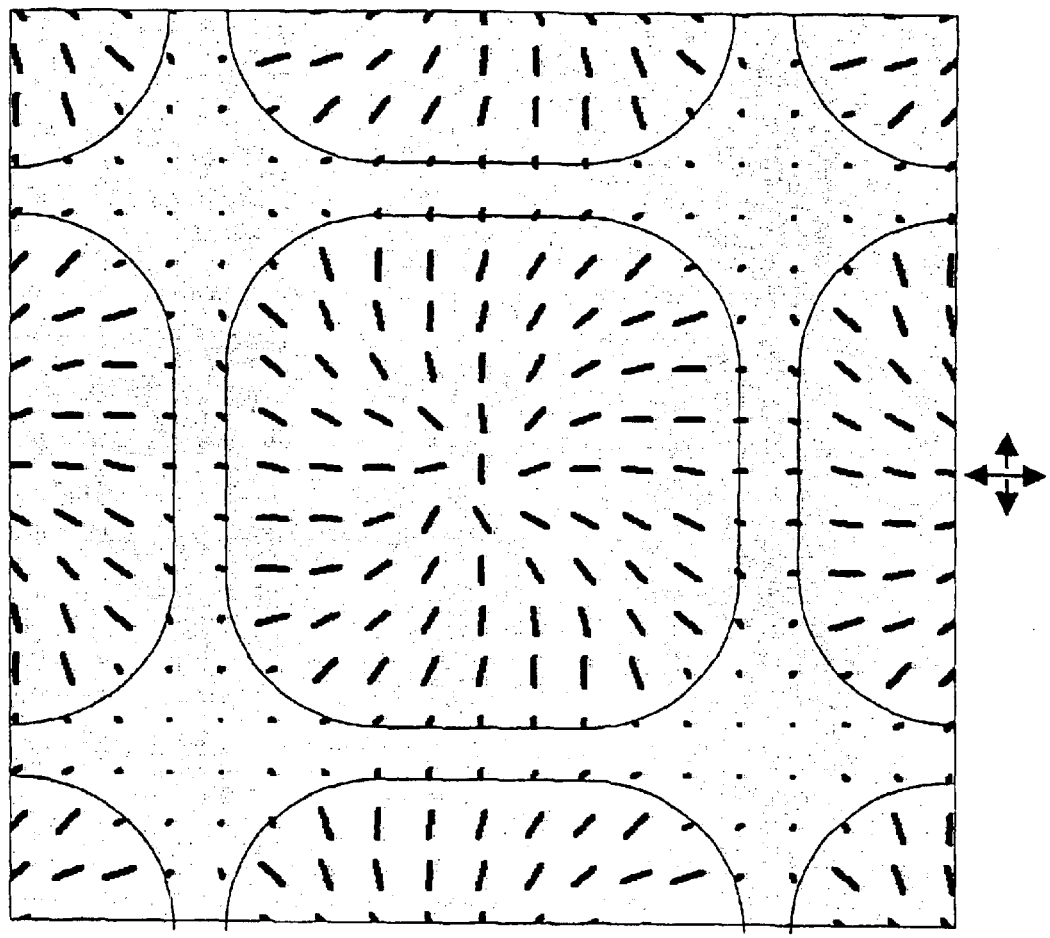
FIG. 22 is a view schematically showing an alignment state of liquid crystal molecules in the vicinity of the surface of the picture element electrode in the liquid crystal display device, when d/p=0.13.

When the liquid crystal does not have a twisted structure, the alignment directions of the liquid crystal molecules were substantially the same (i) in the vicinity of the surface of the counter electrode 22, (ii) in the vicinity of the middle of the liquid crystal layer 30 (thicknesswise), and (iii) in the vicinity of the surface of the picture element electrode 12, as shown in FIGS. 16 through 18. Accordingly, in a liquid crystal region where the liquid crystal molecules 30a are aligned in a direction different from the directions of the polarization axes of the polarization plates 101 and 102, birefringent effect is generated and the light passes therethrough. In contrast, in a region where the liquid crystal molecules 30a are aligned in the same direction as the direction of the polarization axes, birefringence effect does not generate but a clear cross-shaped quenching pattern is generated as shown in FIG. 19.

Figure 23:
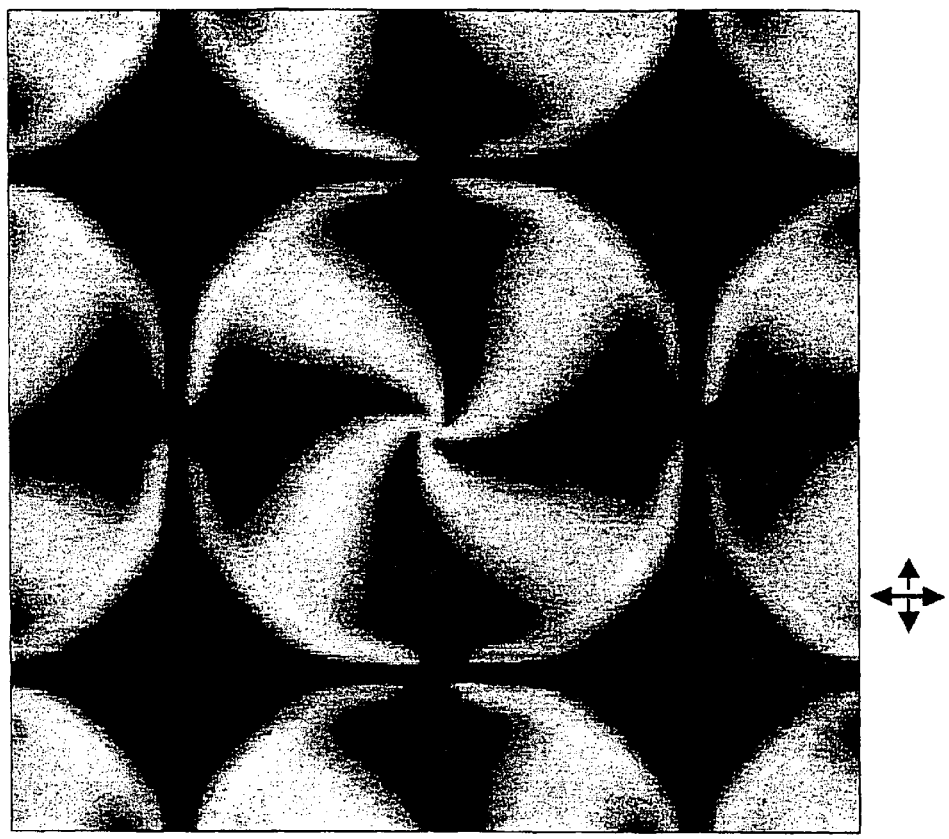
FIG. 23 is a diagram showing a transmission intensity distribution in the liquid crystal display device, when d/p=0.13.
Figure 23:

When d/p=0.13, the alignment directions of the liquid crystal molecules 30a were slightly different from one another (i) in the vicinity of the surface of the counter electrode 22, (ii) in the vicinity of the middle of the liquid crystal layer 30, and (iii) in the vicinity of the surface of the picture element electrode 12, and the liquid crystal layer 30 had a twisted structure between the two substrates, as shown in FIGS. 20 through 23. Further, a swirling alignment was generated in an in-plane direction around the central portion of the domain (the unit solid section 12c in the drawings). Accordingly, a quenching pattern having a swirling shape appeared in the transmission intensity distribution as shown in FIG. 23. However, the quenching pattern is fainter and the area transmission intensity is higher compared with the arrangement where the liquid crystal does not have a twisted structure, because the liquid crystal layer 30 in this case generates an optical rotatory effect by its twisted structure.

Figure 24:
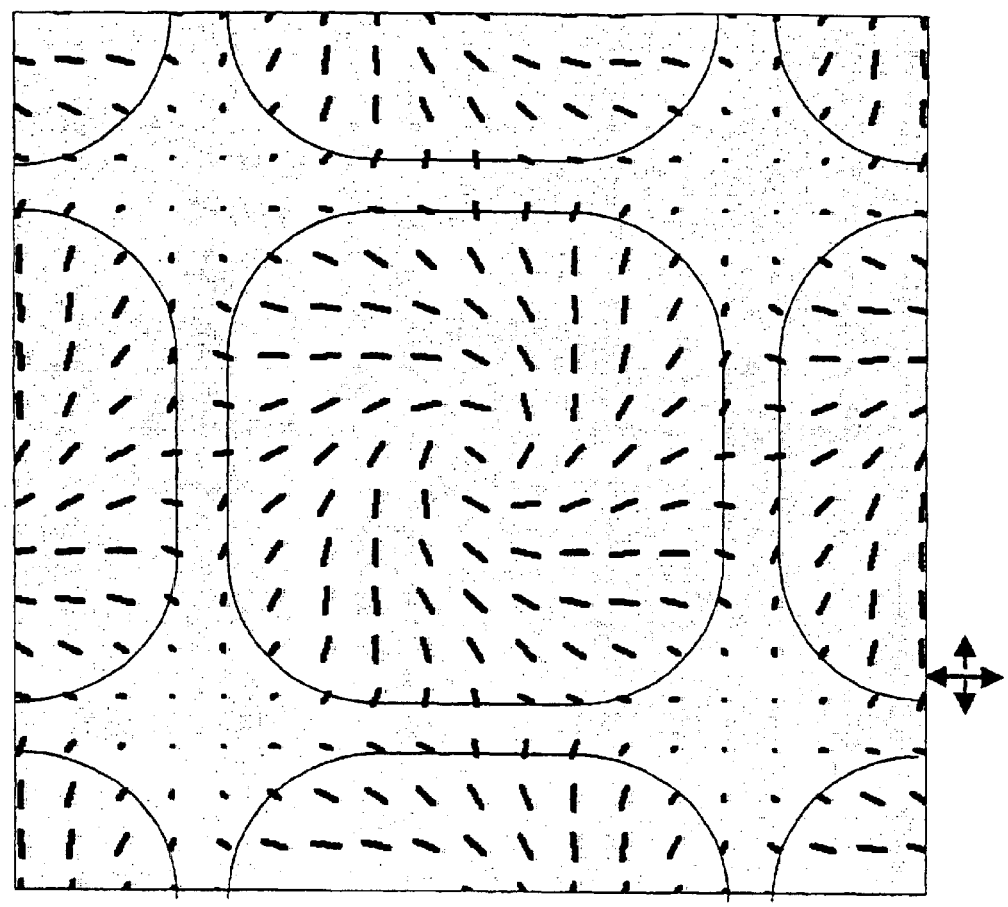
FIG. 24 is a view schematically showing an alignment state of liquid crystal molecules in the vicinity of the surface of the counter electrode in the liquid crystal display device, when d/p=0.38.
Figure 25:
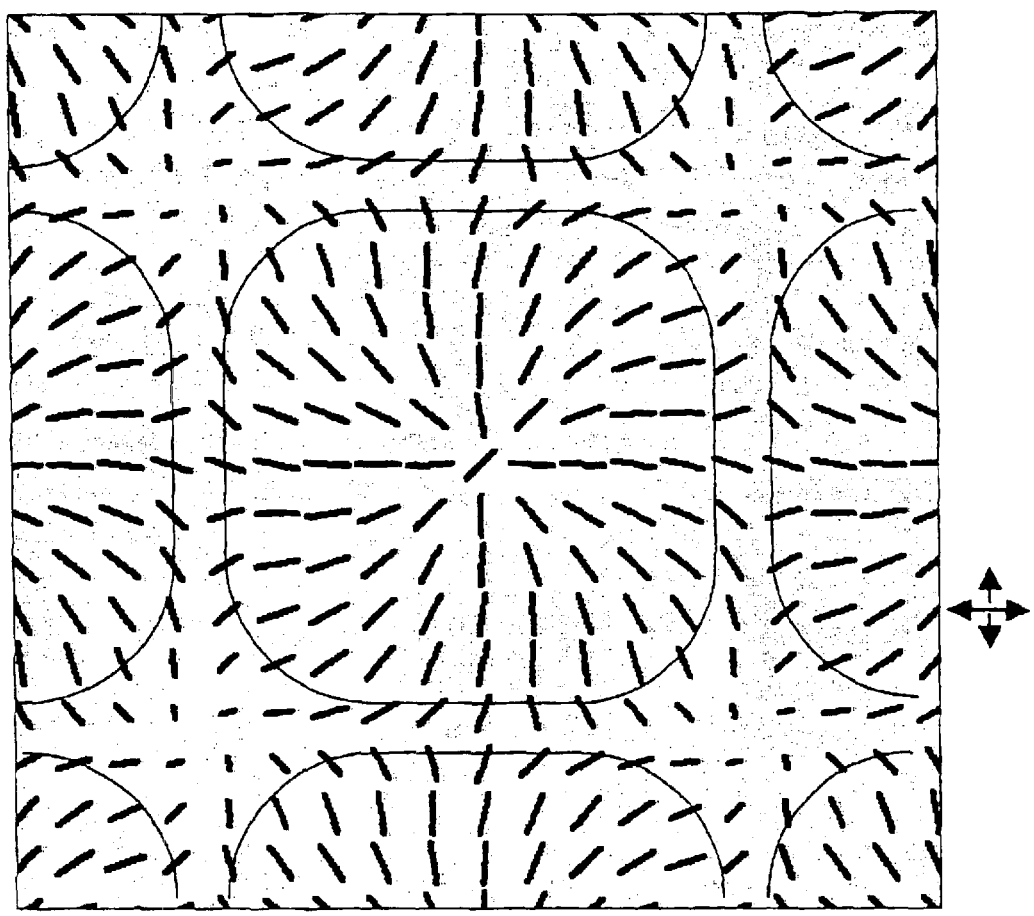
FIG. 25 is a view schematically showing an alignment state of liquid crystal molecules in the vicinity of the middle of the liquid crystal layer in the liquid crystal display device, when d/p=0.38.
Figure 26:
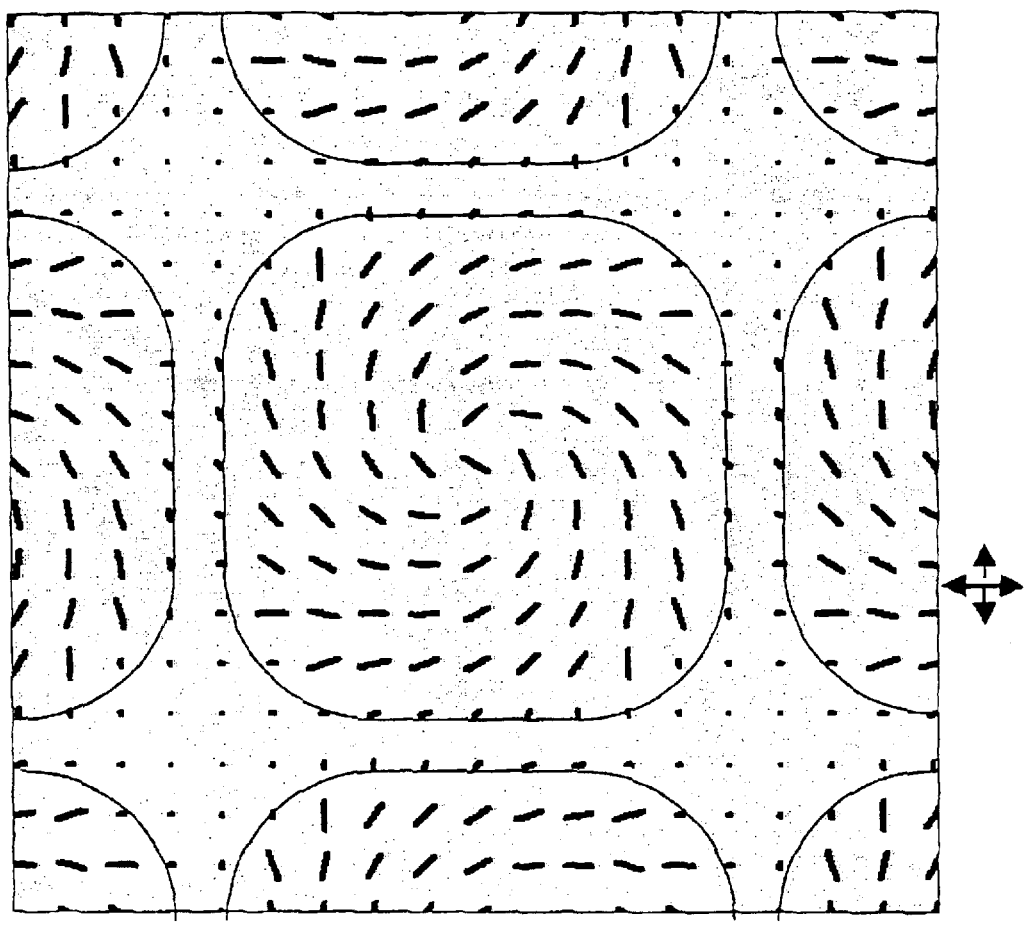
FIG. 26 is a view schematically showing an alignment state of liquid crystal molecules in the vicinity of the surface of the picture element electrode in the liquid crystal display device, when d/p=0.38.
Figure 27:
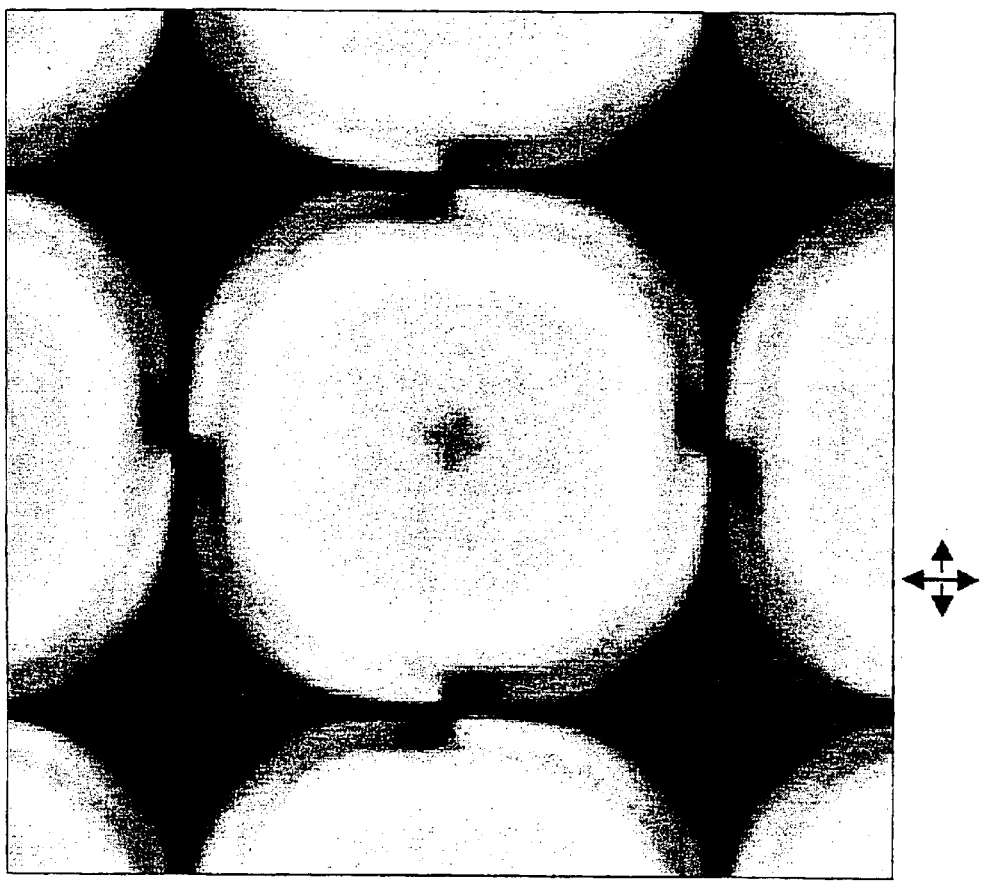
FIG. 27 is a diagram showing a transmission intensity distribution in the liquid crystal display device, when d/p=0.38.
Figure 27:
Figure 28:
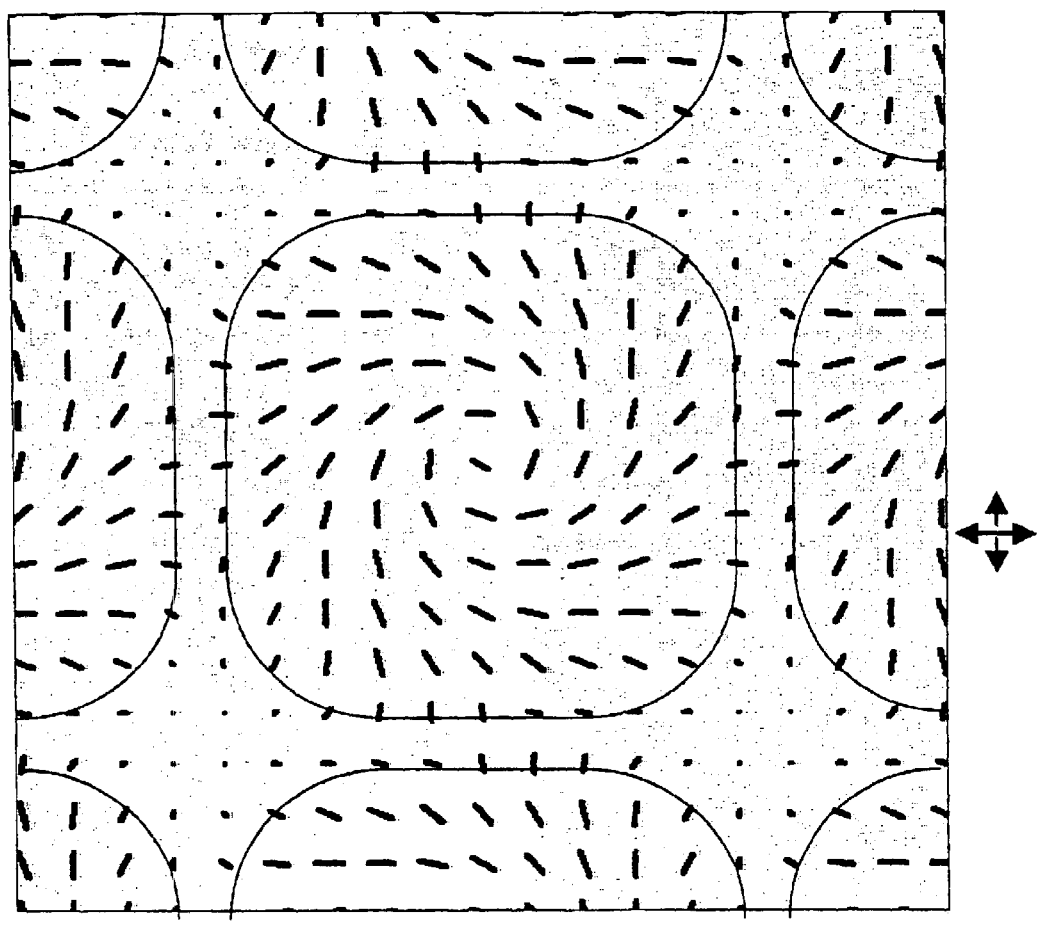
FIG. 28 is a view schematically showing an alignment state of liquid crystal molecules in the vicinity of the surface of the counter electrode in the liquid crystal display device, when d/p=0.48.
Figure 29:
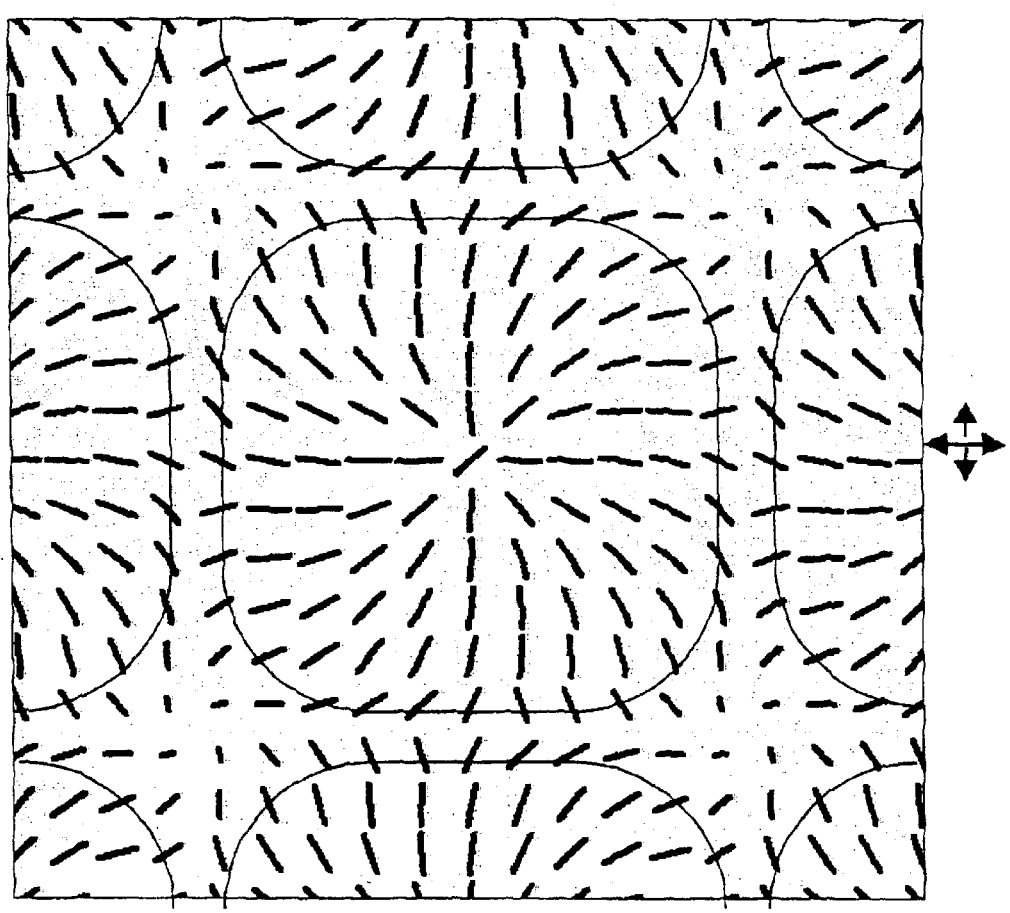
FIG. 29 is a view schematically showing an alignment state of liquid crystal molecules in the vicinity of the middle of the liquid crystal layer in the liquid crystal display device, when d/p=0.48.
Figure 30:
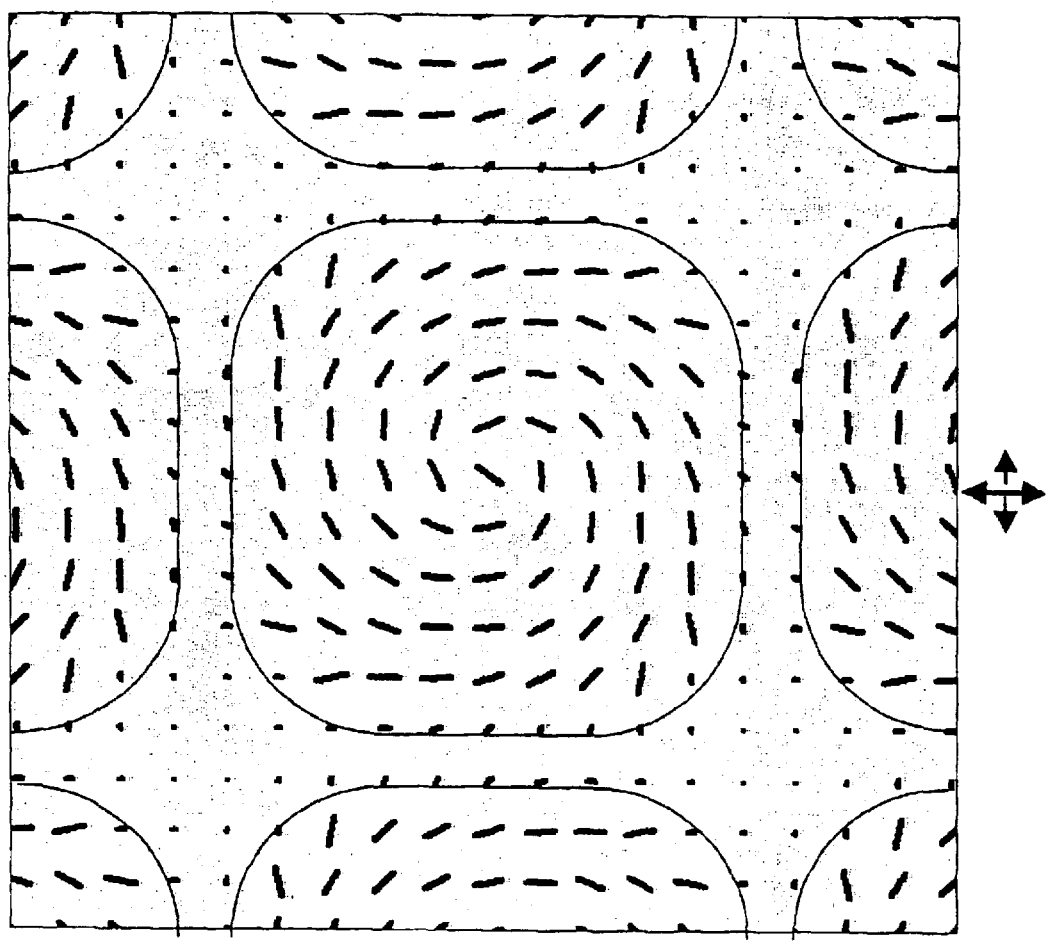
FIG. 30 is a view schematically showing an alignment state of liquid crystal molecules in the vicinity of the surface of the picture element electrode in the liquid crystal display device, when d/p=0.48.

When d/p=0.38, the alignment directions of the liquid crystal molecules 30a (i) in the vicinity of the surface of the counter electrode 22, (ii) in the vicinity of the middle of the liquid crystal layer 30, and (iii) in the vicinity of the surface of the picture element electrode 12 differed from one another more significantly compared with the case where d/p=0.13, so that the twisted structure was more remarkable, as shown in FIGS. 24 through 26. Further, in this case, the area transmission intensity was maximum and the quenching pattern disappeared substantially completely, as shown in FIG. 27. In other words, while obtaining the maximum transmission intensity for each minute unit region, the same amount of the birefringent effect or optical rotatory effect is generated in each minute unit region in the domain.

Figure 31:
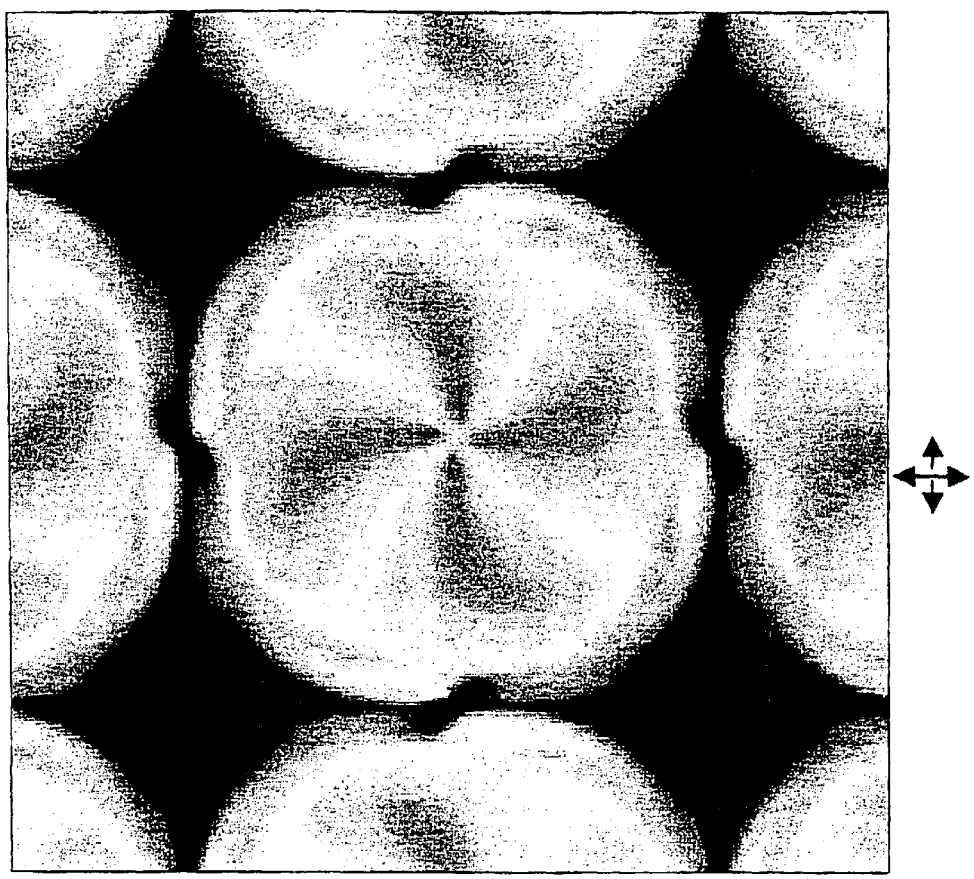
FIG. 31 is a diagram showing a transmission intensity distribution in the liquid crystal display device, when d/p=0.48.
Figure 31:
Figure 32:
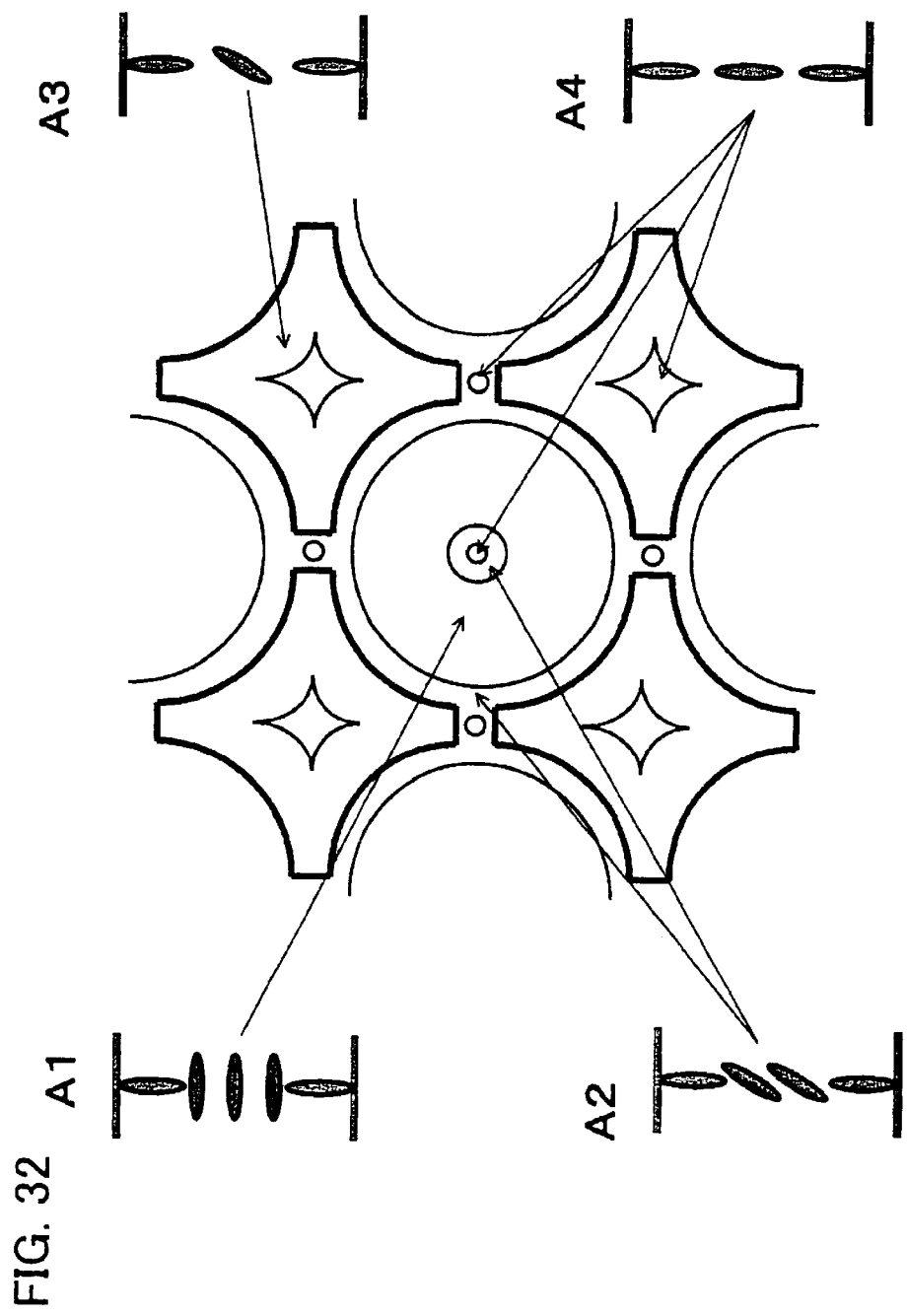
FIG. 32 is a view schematically showing a relationship between different portions of a picture element region and how liquid crystal molecules are aligned in these portions in the liquid crystal display device.

Further, when d/p=0.48 by increasing the twist amount of the liquid crystal, the alignment directions of the liquid crystal molecules 30a (i) in the vicinity of the surface of the counter electrode 22, (ii) in the vicinity of the middle of the liquid crystal layer 30, and (iii) in the vicinity of the surface of the picture element electrode 12 differed from one another even more widely, as shown in FIGS. 27 through 30. However, in this case, a quenching pattern appeared even with the maximum area transmission intensity, as shown in FIG. 31. That is, the minute unit regions in the domain had different amounts of birefringent effect or optical rotatory effect.

In the manner described above, the transmission intensity distribution for d·Δn/λ that maximizes the area transmission intensity were calculated by simulation for each combination of maximum applied effective voltage Vmax and d/p, so as to check for the presence or absence of a quenching pattern. Further, such combinations of d/p, d·Δn/λ, and maximum applied effective voltage Vmax that suppress the quenching pattern to the extent where it cannot be recognized and that yield high area transmission intensities were extracted from the evaluated combinations, i.e., from the combinations of d/p, d·Δn/λ, and maximum applied effective voltage Vmax for the liquid crystal cell 100. Then, a range of the combinations so extracted was approximated with a quadratic expression and a cubic expression regarding Vmax, so as to derive the inequities (1) and (2).

The simulation results confirmed that the quenching pattern is almost unrecognizable and each minute unit region has a high transmission intensity when d/p and d·Δn/λ are set to satisfy the inequities (1) and (2). It was also confirmed that when, on the other hand, d/p and d·Δn/λ do not satisfy the inequities (1) and (2), the quenching pattern appears, and, even when the quenching pattern is absent, each minute unit region has a low transmission intensity, and consequently the area transmission intensity is low.

Here, in order to eliminate the quenching pattern which is generated when the liquid crystal cell 100 is sandwiched between the two polarization plates 101 and 102 whose polarization axes are crosses in a cross nicole arrangement, it is preferable that the same amount of birefringent effect or optical rotatory effect is generated in each minute unit region, so that the each region has the same transmission intensity. In the present embodiment, because of the radially inclined alignment, the angle formed by the polarization direction of light entering the liquid crystal cell 100 and the alignment direction of the liquid crystal molecules 30a on the substrate surface on the light incident side is not uniform for all minute unit regions. Thus, when the liquid crystal layer 30 does not have a twisted structure, i.e., when only the birefringent effect is generated, the amount of birefringent effect generated becomes different from one minute unit region to another, with the result that the quenching pattern is generated.

However, when the liquid crystal layer 30 has a twisted structure with a twist angle of 90 degrees, the same amount of birefringent effect or optical rotatory effect is generated in each minute unit region, irrespective of the angle formed by the polarization direction of light entering the liquid crystal cell 100 and the alignment direction of the liquid crystal molecules 30a in each minute unit region on the substrate surface on the light incident side. That is, it is preferable in the present embodiment that the liquid crystal layer 30 of the liquid crystal cell 100 is uniformly twisted 90 degrees in all minute unit regions.

Figure 33:
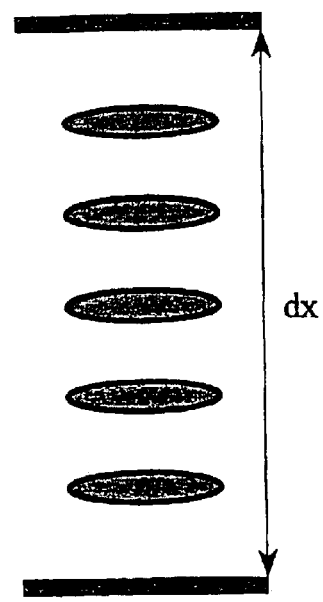
FIG. 33 is a view schematically showing an alignment state of liquid crystal molecules when vertical alignment films on the respective substrate surfaces are assumed to have no alignment regulating forces on the liquid crystal molecules.

In the present embodiment, the liquid crystal molecules 30a are tilted in response to an applied voltage so that the axial directions of the liquid crystal molecules 30a are parallel to the equipotential lines EQ, as described above. Further, in a portion A1 shown in FIG. 32, namely, in the liquid crystal domain other than the central portion and the edge portion EG, the equipotential lines EQ are substantially parallel to the substrate surface. Thus, the liquid crystal molecules 30a in the liquid crystal layer 30 between the substrates 100a and 100b are expected to align themselves so that their long axes direct substantially parallel to the substrate surface over the entire portion dx that extends in the thickness direction, as shown in FIG. 33.

However, in order to provide a vertically aligned state for the liquid crystal molecules 30a under no applied voltage, the surfaces of the substrates 100a and 100b facing the liquid crystal layer 30 are provided with the vertical alignment films 13 and 23, respectively. Accordingly, due to the alignment regulating forces of the vertical alignment films 13 and 23, the liquid crystal molecules 30a at portions dz in the vicinity of the respective substrates retain the vertical alignment state even under applied voltage, as shown in FIG. 34.

Figure 34:
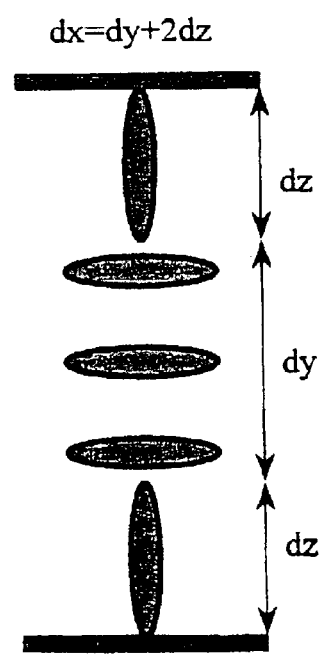
FIG. 34 is a view schematically showing an alignment state of liquid crystal molecules when the vertical alignment films on the respective substrate surfaces are assumed to have alignment regulating forces so that some of the liquid crystal molecules maintain the vertically aligned state even under applied voltage.
Figure 35:
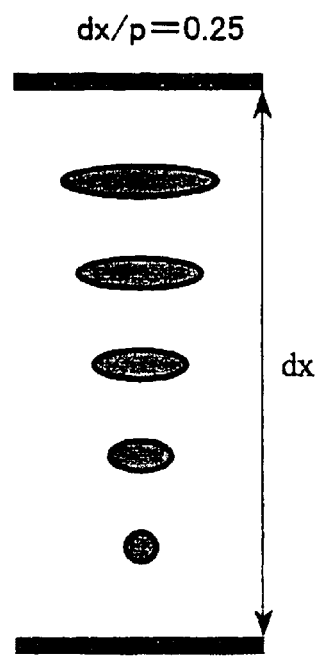
FIG. 35 is a view schematically showing a twisted structure of the liquid crystal layer when the alignment regulating forces are assumed to be absent.

Therefore, as shown in FIG. 34, the liquid crystal molecules 30a that can attain the birefringent effect by being tilted in response to an applied voltage do not exist over the entire portion dx that extends in the thickness direction, but exist in a portion dy excluding portions dz in the vicinity of the substrates. Note that, the thicknesswise lengths of the portions dx, dy, and dz are related to one another by dx=dy+2dz.

The foregoing explained the case where the liquid crystal layer 30 does not have a twisted structure and generates only the birefringent effect, but the same applies to the case where the liquid crystal layer 30 has a twisted structure and generates the optical rotatory effect as well. Namely, in the liquid crystal cell 100 in accordance with the present embodiment, the natural twist pitch p of liquid crystal is set by adding a chiral dopant. However, the in-plane component of the alignment directions (in-plane directions) of the liquid crystal molecules 30a are not regulated. Thus, the liquid crystal molecules 30a are expected to be twisted over the entire portion dx that extends in the thickness direction of the liquid crystal layer 30.

Figure 36:
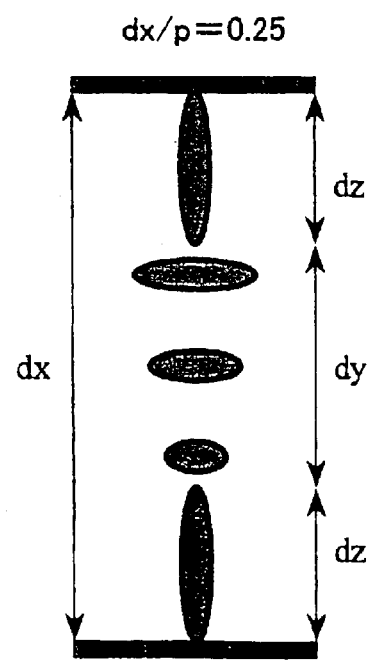
FIG. 36 is a view schematically showing a twisted structure of the liquid crystal layer when the alignment regulating forces are assumed to be present so that some of the liquid crystal molecules maintain the vertically aligned state even under applied voltage.

However, because the regulating forces for vertical alignment are strong on the substrate surfaces in the vertically aligned liquid crystal as described above, the liquid crystal molecules 30a in the portions dz in the vicinity of the substrate surfaces retain the vertically aligned state even when a voltage is applied, as shown in FIG. 36. Accordingly, the liquid crystal molecules 30a that can generate the birefringent effect or optical rotatory effect by being tilted in response to an applied voltage do not exist over the entire portion dx that extends in the thickness direction, but exist in portion dy excluding the portions dz in the vicinity of the substrates. Note that, as with the foregoing, the thicknesswise lengths of the portions dx, dy, and dz are related to one another by dx=dy+2dz.

Accordingly, even if such a condition (d/p=0.25) is set that the quenching pattern is eliminated most efficiently in theory (conventional technique) when the liquid crystal layer 30 having a twisted alignment is sandwiched between the polarization plates 101 and 102 which are arranged in a cross nicole fashion, the condition for actually eliminating the quenching pattern would be different from the theoretical condition because the thickness of the portion dy (effective cell thickness dy) is smaller than the actual cell thickness dx. For example, with Vmax=6 [V], the quenching pattern disappears when d/p is 0.38 in the described embodiment, which widely differs from 0.25, as described above.

A proportion of liquid crystal molecules 30a that retain the vertically aligned state (the thicknesswise length of the portions dz) increases with decrease in applied voltage, and decreases with increase in applied voltage. Accordingly, the effective cell thickness dy changes in accordance with the applied voltage.

Therefore, in the present embodiment, such a value is set for d/p that it is larger than the theoretical value that takes into account tilting of the liquid crystal molecules 30a in the liquid crystal layer 30 over the entire portion dx under applied voltage, and that the value of d/p is in accordance with the maximum applied effective voltage Vmax, as shown in the inequities (1) and (2) as described above. In this way, in the portion A1 shown in FIG. 32, namely, in the portion where most of the liquid crystal molecules 30a are aligned substantially parallel to the substrate surfaces, the birefringent effect or optical rotatory effect can improve the transmission intensity in each minute unit region and can suppress the quenching pattern to such a degree as to be invisible.

Further, by examining the simulation results, a range that produces particularly high brightness was extracted from the range that satisfies the inequities (1) and (2). The extracted range was then used for comparison to find whether or not any decrease in brightness from the extracted range was recognizable for the user, in addition to the evaluation of the foregoing simulation for finding whether or not a quenching pattern is recognizable. As a result, a more preferable range was confirmed to be the following range.

Namely, in the range that satisfies the inequities (1) and (2), a range that satisfies the following inequity (3) is more preferable.

$$d \cdot \Delta n/\lambda \text{ (min)} \leq d \cdot \Delta n/\lambda \leq d \cdot \Delta n/\lambda \text{ (max)},$$

where $d \cdot \Delta n/\lambda \text{ (max)} = -0.00026 \times (V\text{max})^3 + 0.016 \times (V\text{max})^2 - 0.2281 \times (V\text{max}) + 2.041$, and $$d \cdot \Delta n/\lambda \text{ (min)} = -0.00026 \times (V\text{max})^3 + 0.016 \times (V\text{max})^2 - 0.2281 \times (V\text{max}) + 1.891 \qquad (3).$$

Figure 37:
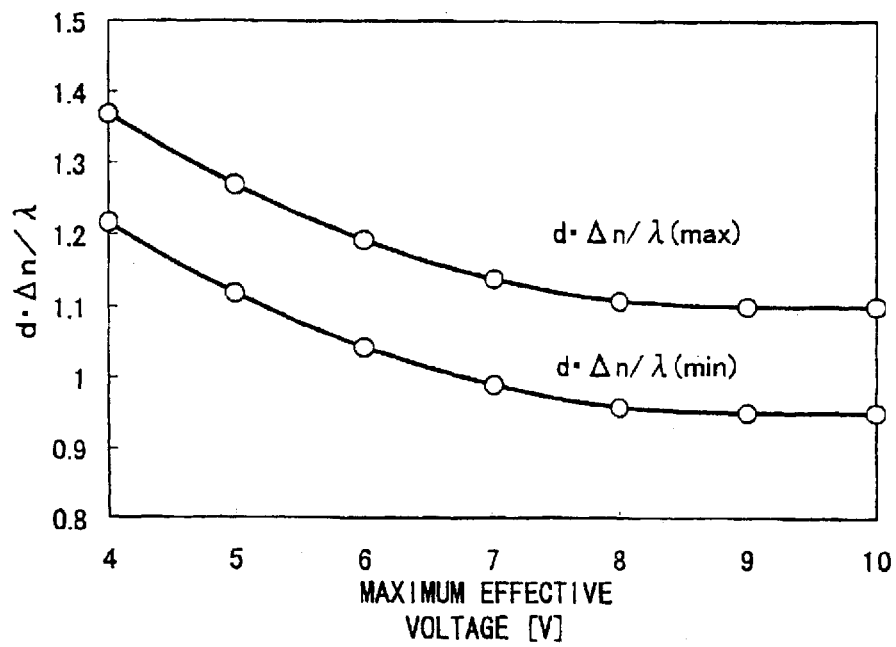
FIG. 37 is a graph representing a numerical range of d·Δn/λ with respect to maximum effective voltage, defining a numerical range in which brightness can be improved.

This range is preferable because any condition within the range permits the user to see the display without recognizing a difference in brightness. That is, d·Δn/λ is preferably set in a range between d·Δn/λ (max) and d·Δn/λ (min) as shown in FIG. 37.

Similarly, in the range that satisfies the inequities (1) and (2), a range that satisfies the following inequity (4) is also preferable.

d/p (min)≦d/p≦d/p (max), where d/p (max)=0.0021×(Vmax)²−0.0458×(Vmax)+0.63, and d/p (min)=0.0021×(Vmax)²−0.0458×(Vmax)+0.53    (4).

Figure 38:
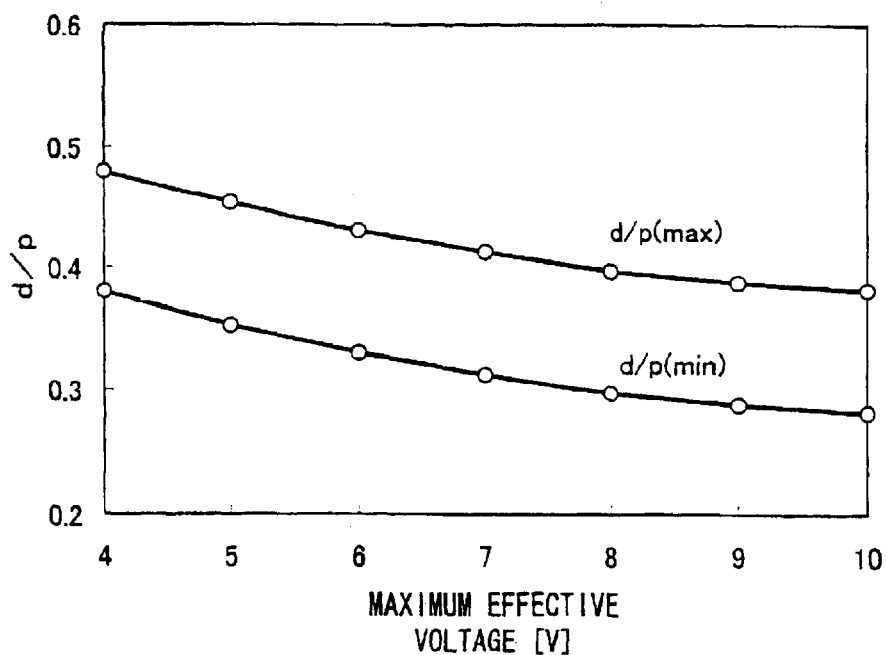
FIG. 38 is a graph showing a numerical range of d/p with respect to maximum effective voltage, defining a numerical range in which brightness can be improved.

This range is preferable because any condition within the range permits the user to see the display without recognizing a difference in brightness. That is, d·Δn/λ is preferably set in a range between d·Δn/λ (max) and d·Δn/λ (min) as shown in FIG. 38.

It was also confirmed that, even when the condition that satisfies the inequities (1) and (2) does not satisfy the inequity (3) or (4), the transmission intensity decreases only to the extent that the user can recognize a difference in brightness, compared with the case where at least one of the inequities (3) and (4) is satisfied.

Incidentally, the foregoing described an example where the opening 12a has a substantially star shape, the unit solid section 12c has a substantially circular shape, and they are arranged in the form of a square lattice, as shown in FIG. 3. However, the shape and the arrangement of the opening 12a and the unit solid section 12c are not limited to the example shown in FIG. 3.

Figure 39:
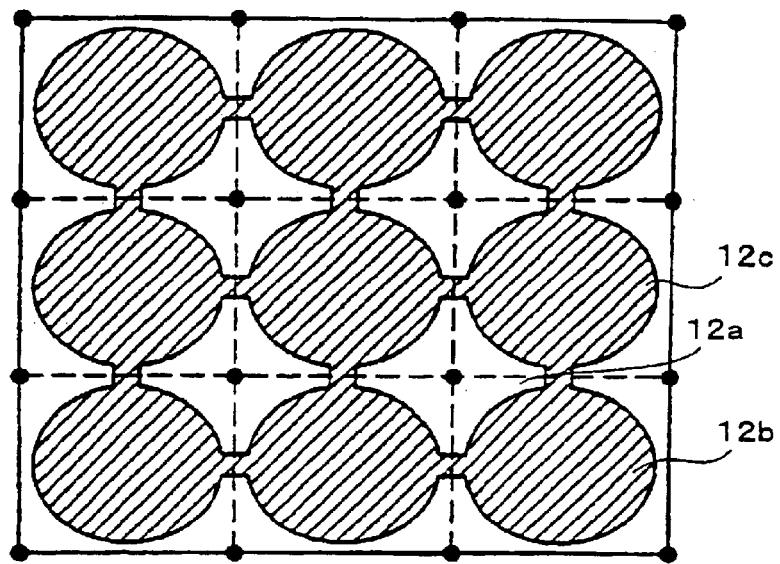
FIG. 39 is a top view showing an alternative form of the picture element electrode in accordance with a modification example of the liquid crystal display device.
Figure 40:
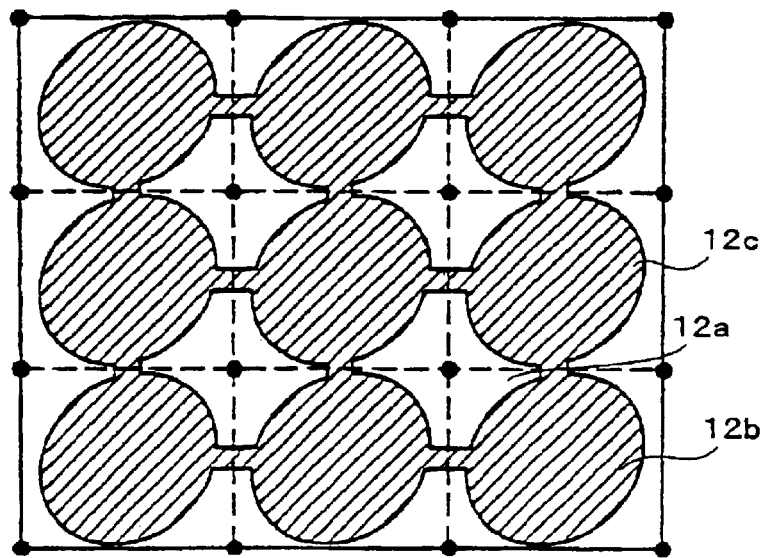
FIG. 40 is a top view showing another alternative form of the picture element electrode in accordance with another modification example of the liquid crystal display device.

For example, as shown in FIGS. 39 and 40, the opening 12a and the unit solid section 12c may be slightly distorted form the shape shown in FIG. 3. In this arrangement, each of the openings 12a has a distorted star shape, and each of the unit solid sections 12c has a substantially ellipsoidal shape (distorted circular shape). Thus, the opening 12a and the unit solid section 12c in this arrangement have a two-fold axis of symmetry (not a four-fold axis of symmetry). Further, the openings 12a and the unit solid sections 12c are orderly arranged so as to form a rectangular unit lattice. Further, in this arrangement, the liquid crystal domain having a radially inclined alignment is also formed for the opening 12a and for the unit solid section 12c by the inclined electric field generated from the edge portions of the opening 12a. Therefore, it is possible to obtain a liquid crystal display device having high display quality and good viewing angle characteristics, as in the case shown in FIG. 3.

Figure 41:
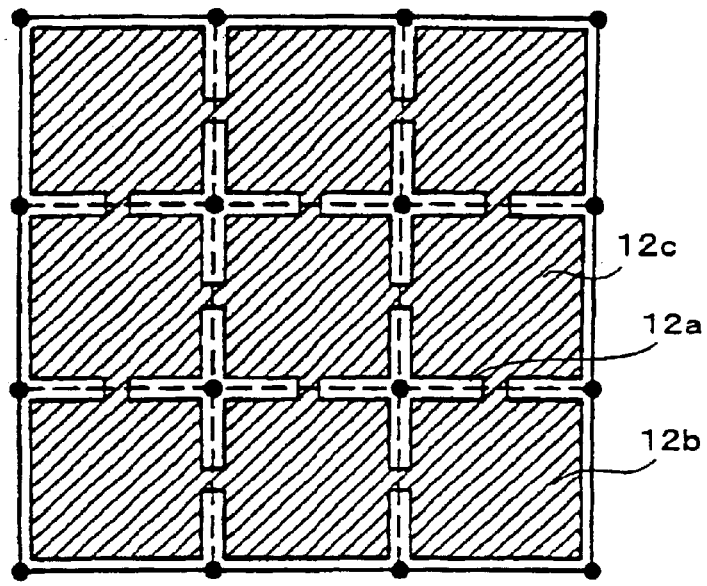
FIG. 41 is a top view showing yet another alternative form of the picture element electrode in accordance with yet another modification example of the liquid crystal display device.
Figure 42:
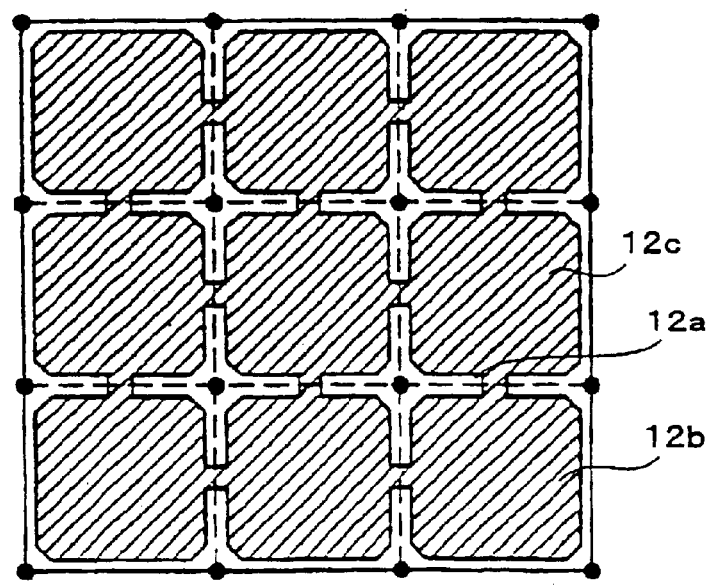
FIG. 42 is a top view showing still another alternative form of the picture element electrode in accordance with still another modification example of the liquid crystal display device.

Further, as shown in FIGS. 41 and 42, the openings 12a may have a substantially cross shape and may be arranged in the form of a square lattice so that each unit solid section 12c has a substantially square shape. Note that, in FIG. 42, the four corners of the unit solid section 12c are linearly cut. Moreover, the openings 12a and the unit solid sections 12c may be distorted and arranged to form a rectangular unit lattice. Even with the orderly arrangement of the unit solid sections 12c each having a substantially rectangular shape (including both square and rectangle), the liquid crystal domain having a radially inclined alignment can also be formed for the opening 12a and for the unit solid section 12c by the inclined electric field generated from the edge portions of the opening 12a. Therefore, it is possible to obtain a liquid crystal display device having high display quality and good viewing angle characteristics, as in the case shown in FIG. 3.

It should be noted, however, that, in the arrangements shown in FIGS. 3, 39, and 40, the edges of the opening 12a are continuous (smooth), and accordingly changes in alignment direction of the liquid crystal molecules 30a are also continuous (smooth). Thus, the radially inclined alignment can be more stabilized when the opening 12a and/or the unit solid section 12c are circular or ellipsoidal rather than rectangular.

Figure 43:
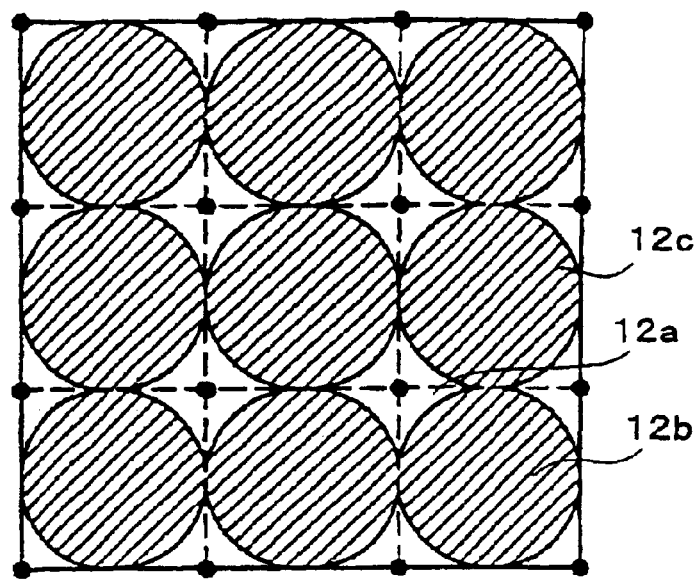
FIG. 43 is a top view showing yet another alternative form of the picture element electrode in accordance with yet another modification example of the liquid crystal display device.
Figure 44:
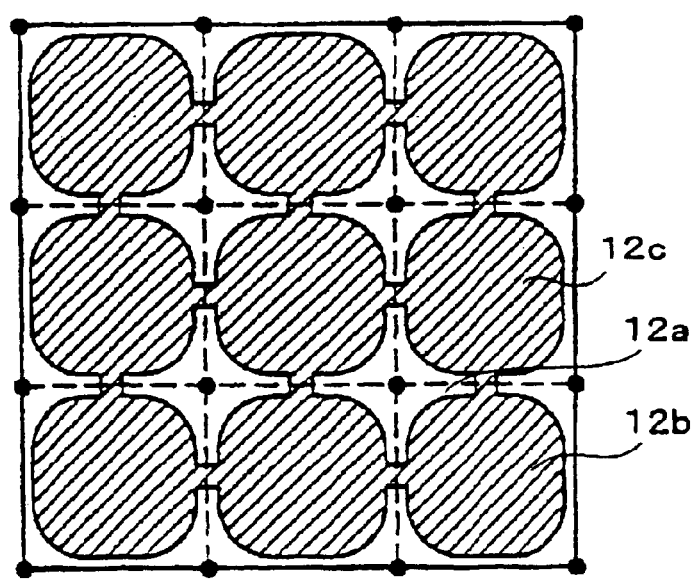
FIG. 44 is a top view showing still another alternative form of the picture element electrode in accordance with still another modification example of the liquid crystal display device.

From the viewpoint of the continuity of the alignment directions of the liquid crystal molecules 30a, the opening 12a may be defined by four arcs, as shown in FIG. 43. Further, the opening 12a may be defined by arc-shaped edges adjacent to the unit solid sections 12c, as shown in FIG. 44. In either case, the openings 12a and the unit solid sections 12c respectively have a four-fold axis of symmetry, and are arranged in the form of a square lattice (having a four-fold axis of symmetry). Alternatively, the openings 12a and the unit solid sections 12c may be deformed into a shape having a two-fold axis of symmetry in the form of a rectangular lattice (having a two-fold axis of symmetry), in substantially the same manner as in FIGS. 39 and 40. In either case, the edges of the openings 12a are continuous (smooth), and accordingly changes in alignment direction of the liquid crystal molecules 30a are also continuous (smooth). This enables the liquid crystal molecules to have a more stable radially inclined alignment, as in the arrangements of FIGS. 3, 39, and 40.

Figure 45:
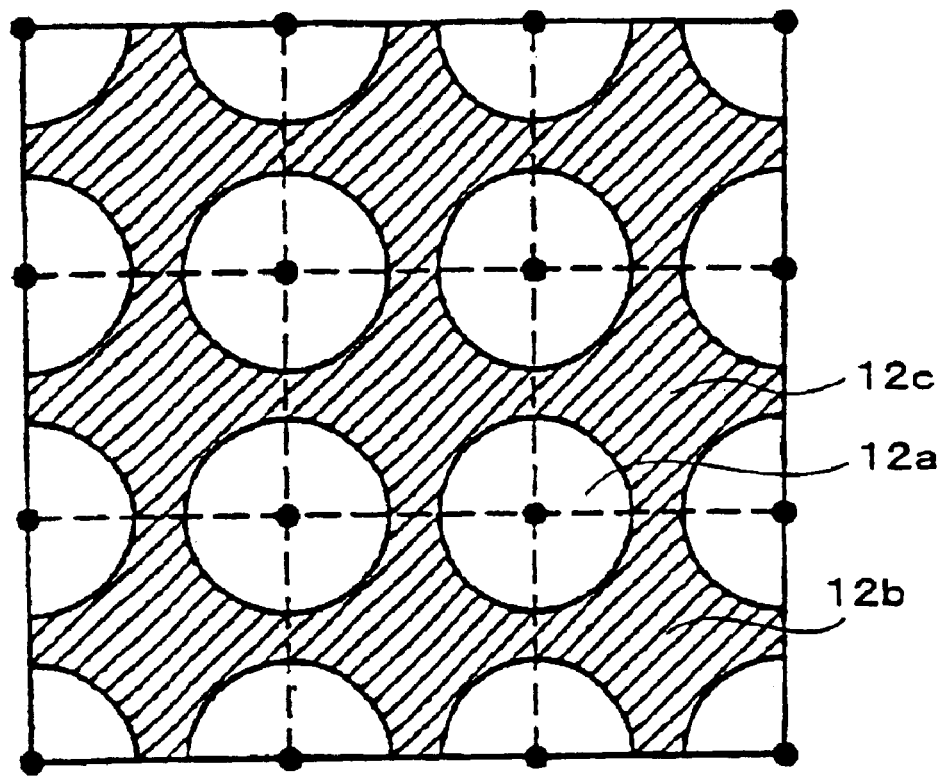
FIG. 45 is a top view showing yet another alternative form of the picture element electrode in accordance with yet another modification example of the liquid crystal display device.
Figure 46:
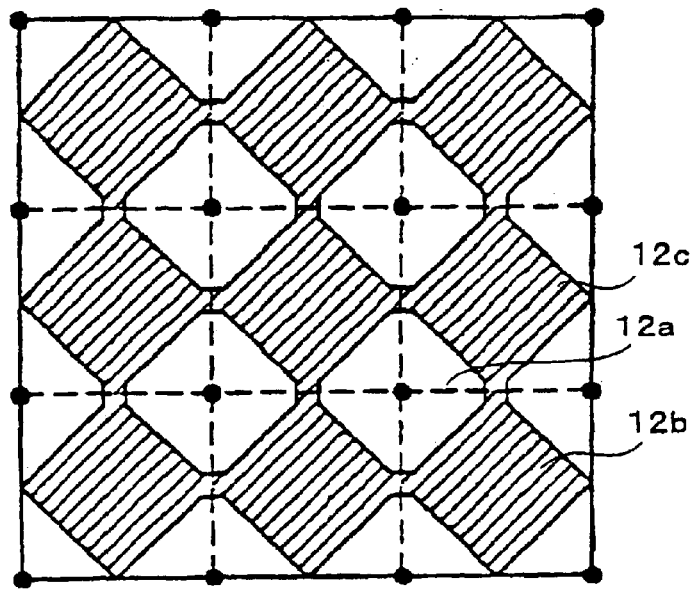
FIG. 46 is a top view showing still another alternative form of the picture element electrode in accordance with still another modification example of the liquid crystal display device.
Figure 47:
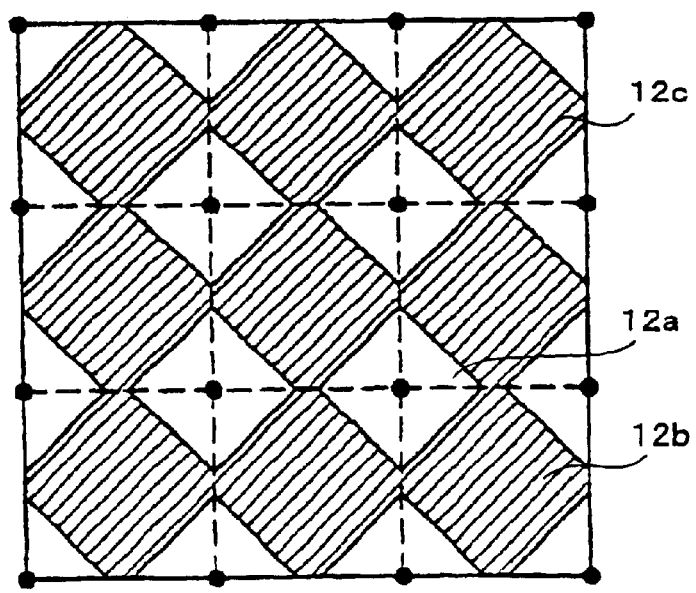
FIG. 47 is a top view showing yet another alternative form of the picture element electrode in accordance with yet another modification example of the liquid crystal display device.

In the foregoing examples, the openings 12a are in the form of a substantially star shape or a substantially cross shape, and the unit solid sections 12c are in the form of a substantially circular shape, a substantially ellipsoidal shape, a substantially square (rectangular) shape, or a substantially rectangular shape with round corners. With these various shapes, the negative/positive pattern for the openings 12a and the unit solid sections 12c may be reversed. For example, FIG. 45 shows a picture element electrode whose positive/positive pattern for the openings 12a and the unit solid sections 12c of the picture element electrode 12 shown in FIG. 3 is reversed. The functions of the picture element electrode remain substantially the same even when its negative/positive pattern is reversed. Note that, in some patterns such as those shown in FIGS. 46 and 47 in which the openings 12a and the unit solid sections 12c both have a substantially square shape, the pattern remains the same even when the negative/positive pattern is reversed.

In the pattern shown in FIG. 45 in which the negative/positive pattern of FIG. 3 is reversed, it is preferable, as in FIG. 3, that the edge portions of the picture element electrode 12 partially have the openings 12a (approximately a half or quarter of the opening 12a), so as to form unit solid sections 12c that are rotationally symmetrical. With this pattern, the edge portions of the picture element region, as well as the central portion, can obtain the effect of the inclined electric field, thereby stably realizing a radially inclined alignment over the entire picture element region.

Referring to the picture element electrode 12 of FIG. 3 and the picture element electrode of FIG. 45 having the reversed negative/positive pattern of FIG. 3, the following describes which negative/positive pattern (negative pattern or positive pattern) should be used.

In either negative/positive pattern, the length of the edges of the opening 12a is the same. Accordingly, the function to generate the inclined electric field is the same in either pattern. However, the area ratio of the unit solid sections 12c (a proportion of the unit solid sections 12c in the entire area of the picture element electrode 12) may be different between the negative pattern and positive pattern. Namely, the area of the unit solid sections 12b (where the conductive film actually exists) that generates an electric field to be applied to the liquid crystal molecules in the liquid crystal layer may be different between these two patterns.

Here, the voltage applied to the liquid crystal domain formed on the opening 12a is lower than the voltage applied to the liquid crystal domain formed on the solid section 12b. Accordingly, in normally-black-mode display for example, the liquid crystal domain formed on the opening 12a becomes dark. Thus, as the area ratio of the openings 12a becomes larger, the display brightness tends to decrease. It is therefore preferable that the unit solid sections 12b have a larger area ratio.

Figure 48:
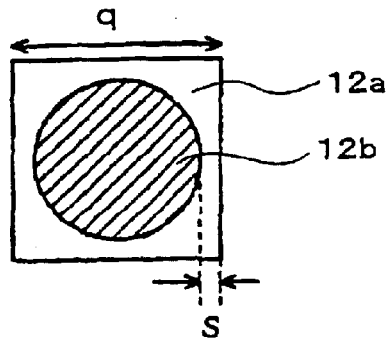
FIG. 48 is a top view showing a unit lattice in which a unit solid section has a circular shape.
Figure 49:
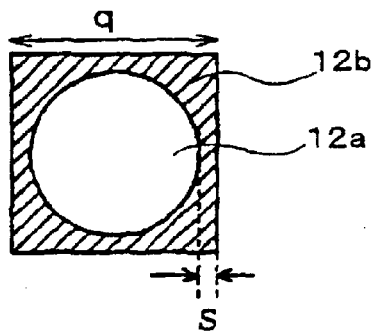
FIG. 49 is a top view showing a unit lattice in which an opening has a circular shape.

Whether or not the area ratio of the unit solid sections 12b is increased by reversing the negative/positive pattern depends on the pitch (size) of the unit lattice. Namely, the arrangement of FIG. 3 has a unit lattice pattern as shown in FIG. 48, and the arrangement of FIG. 45 has a unit lattice pattern as shown in FIG. 49. Note that, FIG. 49 shows the opening 12a at the center of the drawing. Further, the portions for mutually connecting the unit solid sections 12c in the arrangement of FIG. 45 (branch portions that extend in four directions from the circular portion) are omitted in FIG. 49.

It is assumed here that the length (pitch) of a side of the square unit lattice is q, and the length of a spacing (side spacing) between the unit lattice and the opening 12a or the unit solid section 12 is s. Then, in order to examine stability or other properties of the radially inclined alignment, a variety of picture element electrodes 12 respectively having different pitches p and different side spacings s were formed. As a result, it was found that a side spacing s of approximately 2.75 μm or greater is required for the picture element electrode 12 having the pattern of FIG. 48 (hereinafter referred to as "positive type pattern") to generate the required inclined electric field for obtaining the radially inclined alignment. On the other hand, it was found that a side spacing s of approximately 2.25 μm or less is required for the picture electrode 12 having the pattern of FIG. 49 (hereinafter referred to as "negative type pattern") to generate the required inclined electric field for obtaining the radially inclined alignment. Table 1 and FIG. 50 show the examination results for the area ratio of the unit solid sections 12b, when the pitch q was varied with the side spacings s set to these lower limits.

TABLE 1

| Pitch q [μm] | Area ratio of solid section (%) | |
| --- | --- | --- |
| | Positive type (a) | Negative type (b) |
| 20 | 41.3 | 52.9 |
| 25 | 47.8 | 47.2 |
| 30 | 52.4 | 43.3 |
| 35 | 55.8 | 40.4 |
| 40 | 58.4 | 38.2 |
| 45 | 60.5 | 36.4 |
| 50 | 62.2 | 35.0 |

Figure 50:
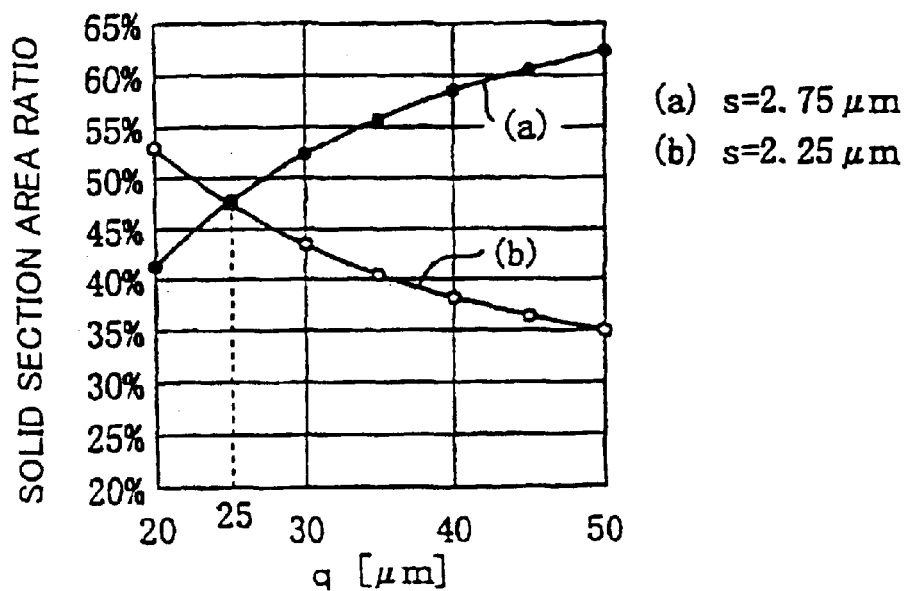
FIG. 50 is a graph plotting the area ratio of the solid section with respect to the pitch of the picture element region for the unit lattice with the circular unit solid section and for the unit lattice with the circular opening.

As can be seen from Table 1 and FIG. 50, the area ratio of the solid section 12b is greater in the positive type (FIG. 48) when the pitch q is not smaller than approximately 25 μm, whereas the area ratio of the solid section 12b is greater in the negative type (FIG. 49) when the pitch q is smaller than approximately 25 μm. Therefore, in respect to the display luminance and stability of alignment, the pattern to be employed changes according to whether the pitch q of the unit lattice is greater or smaller than approximately 25 μm. For example, the positive pattern shown in FIG. 48 is preferably employed when three or less unit lattices are provided, whereas the negative pattern shown in FIG. 49 is preferably employed when four or more unit lattices are provided on the picture element electrode 12 having a width of 75 μm in the width direction. The positive type or negative type should be selected for patterns other than those as exemplified above, so as to increase the area ratio of the solid sections 12b.

The foregoing described the case where a plurality of square or rectangular unit lattices are formed within a picture element region. However, substantially the same effects can be achieved no matter what shape the picture element electrode 12 has, provided that the vertically aligned liquid crystal molecules are aligned.

To improve the viewing angle dependency of display quality of the liquid crystal display device in all directions, the probability of existence of the liquid crystal molecules aligned in all azimuth angle directions preferably assumes rotational symmetry, and more preferably axial symmetry, in every picture element region. In other words, the liquid crystal domains formed over the entire picture element region are preferably arranged to have rotational symmetry and, more preferably axial symmetry. However, the liquid crystal domains are not necessarily required to be rotationally symmetrical with respect to the entire picture element region. Instead, an aggregate of liquid crystal domains (a plurality of liquid crystal domains that are arrayed in the form of a square lattice for example) which are arrayed to be rotationally symmetrical (or axially symmetrical) should constitute the picture element region in the liquid crystal layer. For example, when the minimum unit of the picture element region is a square lattice (which is symmetrical having a four-fold axis of symmetry), and when the picture element region is made up of a combination of the square lattices, the liquid crystal molecules can be aligned with essentially equal probability for all azimuth angles over the entire picture element region. Accordingly, it is not required for the plurality of openings 12a formed in the picture element region to be rotationally symmetrical with respect to the entire picture element region. Instead, the plurality of openings 12a should be arrayed as an aggregate of openings (a plurality of openings arrayed in the form of a square lattice, for example) which are arrayed to be rotationally symmetrical (or axially symmetrical). The unit solid sections 12c, each of which is substantially surrounded by the plurality of openings 12c, may be similarly arranged.

Further, each liquid crystal domain is also preferably formed to be rotationally symmetrical or axially symmetrical. Accordingly, it is preferable that each opening 12a and each unit solid section 12c in each liquid crystal domain are also rotationally symmetrical or axially symmetrical. More specifically, the display characteristics of the liquid crystal display device exhibit azimuth angle dependency, due to the aligned state of the liquid crystal molecules (optical anisotropy). To reduce the azimuth angle dependency of the display characteristics, the liquid crystal molecules are preferably arranged with equal probability for all azimuth angles. Further, it is more preferable that the liquid crystal molecules in each picture element region are aligned with equal probability for all azimuth angles. Accordingly, the openings 12a are preferably of a shape that forms such a liquid crystal domain that the liquid crystal molecules 30a in each picture element region are aligned with equal probability for all azimuth angles. Specifically, the opening 12a is preferably formed to be rotationally symmetrical (preferably with a two or greater fold axis of symmetry) about its center (normal direction) as the symmetrical axis, and a plurality of the openings 12a are preferably arranged to be rotationally symmetrical. Further, the unit solid sections 12c, each of which is substantially surrounded by the openings 12a, preferably has a rotationally symmetrical shape, and the unit solid section 12c is preferably arranged to be rotationally symmetrical.

Note that, there are cases where a voltage is not sufficiently applied to the liquid crystal layer 30 in the vicinity of the center of the opening 12a so that the voltage does not contribute to display in this portion of the liquid crystal layer 30. In other words, there is a case where display quality is not impaired even when the liquid crystal layer 30 in the vicinity of the center of the opening 12a has a slightly disturbed radially inclined alignment (even when the central axis does not exactly lie on the center of the opening 12a, for example). Thus, at least the liquid crystal domain corresponding to the unit solid section 12c should be arranged to be rotationally symmetrical or axially symmetrical.

Incidentally, the foregoing described the case where the liquid crystal cell 100 is provided with the thin film transistor (TFT) as a pixel element driving element (active element). However, an active element is not limited to this. For example, an MIM (Metal Insulator Metal) element may be used as an active element for switching the picture element electrode 12. Further, the liquid crystal display device is not limited to be of an active matrix type but may be of a simple matrix type. However, the active matrix liquid crystal display device, as in the present embodiment, can achieve display having higher definition and higher brightness compared with the simple matrix liquid crystal display device, thereby realizing a liquid crystal display device having good display quality.

Note that, the foregoing described the case where the liquid crystal display device is of a transmissive type as an example. However the liquid crystal display device may be of a reflective type or of a transflective type. Further, even though the foregoing described the case where the openings 12a are formed in the picture element electrode 12, the same effects can also be achieved when the openings are formed in the counter electrode 22.

As described above, a liquid crystal display device of the present invention is so arranged that d/p is set in a range between $0.0021\times(Vmax)^2-0.0458\times(Vmax)+0.65$ and $0.0021\times(Vmax)^2-0.0458\times(Vmax)+0.50$, and that $d\cdot\Delta n/\lambda$ is set in a range between $-0.00026\times(Vmax)^3+0.016\times(Vmax)^2-0.2281\times(Vmax)+2.124$ and $-0.00026\times(Vmax)^3+0.016\times(Vmax)^2-0.2281\times(Vmax)+1.7603$, where d/p is the ratio of a thickness d of a liquid crystal layer of a vertical alignment mode with respect to the natural twist pitch p of a liquid crystal, Vmax [V] is the maximum applied effective voltage applied across the first electrode and the second electrode, and $\Delta n$ is the refractive anisotropy of the liquid crystal layer.

With this arrangement, the liquid crystal layer has defined values of d/p and $d\cdot\Delta n/\lambda$ that reduce a quenching pattern to such a degree as to be unrecognizable for a user. Therefore, it is possible to surely provide a liquid crystal display device capable of realizing brighter display with higher display quality, compared with the case where the quenching pattern due to the liquid crystal molecules is recognized.

The liquid crystal display device of the present invention according to the foregoing arrangement may be so arranged that $d\cdot\Delta n/\lambda$ is set in a range between $-0.00026\times(Vmax)^3+0.016\times(Vmax)^2-0.2281\times(Vmax)+2.041$ and $-0.00026\times(Vmax)^3+0.016\times(Vmax)^2-0.2281\times(Vmax)+1.891$.

Further, the liquid crystal display device of the present invention according to the foregoing arrangement may be so arranged that d/p is set in a range between $0.0021\times(Vmax)^2-0.0458\times(Vmax)+0.63$ and $0.0021\times(Vmax)^2-0.0458\times(Vmax)+0.53$.

With these arrangements, since the liquid crystal layer has defined values of d/p and $d\cdot\Delta n/\lambda$ in the foregoing ranges, it is possible to realize a liquid crystal display device capable of realizing even brighter display.

Further, the liquid crystal display device of the present invention may be so arranged that the liquid crystal layer includes a picture element region defined by the first electrode and the second electrode, the picture element region including at least one liquid crystal domain in which liquid crystal molecules under applied voltage are aligned radially or in an axially symmetrical manner. Note that, the center of the radial alignment may or may not lie exactly on the center of the liquid crystal domain. Alternatively, the liquid crystal display device of the present invention may be so arranged that the liquid crystal layer includes one or more picture element regions defined by the first electrode and the second electrode, and the first electrode has a portion that corresponds to the picture element region and in which one or more openings are formed, the opening and a solid section, which is a portion of the first electrode other than the opening, each having a liquid crystal domain in which alignment directions of liquid crystal molecules are controlled by an inclined electric field generated from edge portions of the opening when a voltage is applied across the first electrode and the second electrode.

With these arrangements, the picture element region has the liquid crystal domain, and the liquid crystal molecules in the liquid crystal domain are aligned radially or in an axially symmetrical manner. Thus, portions in the liquid crystal domain in which liquid crystal molecules are respectively aligned in different directions can be optically compensated for with one another. As a result, when the user views the liquid crystal display device in any direction, the intensity of emergent light (picture element brightness) is substantially the same over the entire picture element region, thereby realizing a liquid crystal display device having good viewing angle characteristics.

Here, when the liquid crystal molecules are aligned radially or in an axially symmetrical manner, some of the liquid crystal molecules are aligned such that their in-plane component coincides with the directions of the polarization axes of the polarization plates. However, in the foregoing arrangement, the defined values of d/p and $d\cdot\Delta n/\lambda$ in the foregoing ranges can avoid the quenching pattern due to the liquid crystal molecules to a degree as to be unrecognizable for the user. Therefore, it is possible to realize a liquid crystal display device having both good viewing angle characteristics and good display quality.

In particular, in the arrangement having the openings, the liquid crystal domain formed on the opening and the liquid crystal domain formed on the solid section are formed by an inclined electric field generated from the edge portions of the openings. Therefore, the liquid crystal domains are formed adjacent with each other, and the liquid crystal molecules in the adjacent liquid crystal domains have a substantially continuous alignment. As a result, a disclination line is not formed between the liquid crystal domain formed on the opening and the liquid crystal domain formed on the solid section, thereby preventing impairment of display quality. Further, since the alignment of the liquid crystal molecules in the adjacent liquid crystal domains is substantially continuous, high stability can be maintained for the alignment of the liquid crystal molecules.

Further, the liquid crystal display device of the present invention, when provided with an opening, may be so arranged that a plurality of the openings are provided in each of the picture element regions, and the liquid crystal domain is formed for (i) each of the openings and for (ii) each of one or more unit solid sections, which is a portion of the solid section surrounded by the openings.

With this arrangement, since a plurality of openings are provided for each of the picture element regions, the openings can be sized to be smaller than the size when only a single opening is provided, provided that the size of the picture element region is the same. This increases the area of the liquid crystal layer (viewed in a direction normal to the substrate) that is directly influenced by the inclined electric field. With this, it is possible to improve the optical characteristics of the liquid crystal layer in response to an applied voltage (transmission intensity, for example), while improving the alignment regulating forces on the liquid crystal molecules.

Further, the liquid crystal display device of the present invention may be so arranged that the openings are substantially identical with one another in shape and size, and each of the openings forms a unit lattice arranged to have rotational symmetry. For example, the openings may be arranged so that the center of each opening form a square lattice. Note that, when the picture element region is divided with an opaque constituent member such as an auxiliary capacitance line for example, the unit lattice should be arranged in each region that contributes to the display area.

With this arrangement, since the unit lattice is arranged to have rotational symmetry, a plurality of liquid crystal domains are arranged with high symmetry, with the unit lattice as a unit of symmetry. This can improve the viewing angle dependency, which is one criteria of display quality. Further, by dividing the entire picture element region into unit lattices, the alignment of the liquid crystal layer can be stabilized over the entire picture element region.

Further, the liquid crystal display device of the present invention may be so arranged that at least one of the openings (typically, the opening that forms the unit lattice) has a rotationally symmetrical shape. For example, each of the openings (when viewed in a direction normal to the substrate) may have a substantially circular shape, or a substantially regular polygonal shape (substantially square shape, for example).

With these arrangements, since the opening has a rotationally symmetrical shape, stability of the radially inclined alignment of the liquid crystal domain formed on the opening can be improved. In particular, when the opening is formed in a substantially circular shape, it is possible to further improve stability of the radially inclined alignment of the liquid crystal domain formed on the opening.

At least one of the unit solid sections may have a substantially circular shape. With this arrangement, it is possible to improve stability of the radially inclined alignment of the liquid crystal domain formed on the unit solid section.

Note that, in either case, in each picture element region, a sum of the areas of the openings is smaller than the area of the solid section on the first electrode. A larger area for the solid section increases an area of the liquid crystal layer (viewed in a direction normal to the substrate) that is directly influenced by the electric field generated by the electrodes, thereby improving the optical characteristics (transmission intensity, for example) of the liquid crystal layer in response to an applied voltage For example, from the arrangement in which the opening has a substantially circular shape and the arrangement in which the unit solid section has a substantially circular shape, whichever arrangement that increases the area of the solid section is preferably selected. In this way, the area of the liquid crystal layer (as viewed in a direction normal to the substrate) that is directly influenced by the electric field generated by the electrodes can be increased, thereby improving the optical characteristics (transmission intensity, for example) of the liquid crystal layer in response to an applied voltage. Typically, the openings are preferably formed so that the solid section has a substantially circular shape when the pitch of the unit lattice is not less than approximately 25 [$\mu$m], and that the opening has a substantially circular shape when the pitch of the unit lattice is less than approximately 25 [$\mu$m].

At least one of the plurality of unit solid sections may have a substantially rectangular shape with substantially arc-shaped corners. With this arrangement, it is possible to improve stability of the radially inclined alignment of the liquid crystal domain formed on the unit solid section, and to improve transmittance (effective aperture ratio).

Further, the liquid crystal layer may have a dielectric anisotropy $\Delta \in$ in a range of from −2.5 to −6.5, and an elastic constant ratio K11/K33 of from 0.9 to 2.0. This can further improve transmission intensity when d/p and d·$\Delta$n/$\lambda$ are set in the foregoing ranges, thereby realizing a liquid crystal display device capable of realizing even brighter display.

Further, the liquid crystal display device of the present invention may be so arranged that the first electrode is made up of a plurality of picture element electrodes that respectively correspond to a plurality of the picture element regions, and the first substrate includes an active element that is provided for each of the picture element regions so as to switch the first electrode.

With such an active matrix liquid crystal display device, it is possible to realize display with higher definition and higher brightness compared with a simple matrix liquid crystal display device, thereby realizing a liquid crystal display device having excellent display quality.

Further, in the arrangement having the openings, it is possible to realize stable radially inclined alignment only by providing the openings for one of the pair of electrodes that face each other via the liquid crystal layer sandwiched therebetween. Therefore, it is possible to manufacture the liquid crystal display device according to a known manufacturing method, only by modifying a photomask in such a manner that an opening having a desired shape is formed at a desired position when patterning a conductive film into the picture element electrode.

The invention being thus described, it will be obvious that the same may be varied in many ways. Such variations are not to be regarded as a departure from the spirit are scope of the invention, and all such modifications as would be obvious to one skilled in the art are intended to be included within the scope of the following claims.

What is claimed:

1. A liquid crystal display device having a first substrate, a second substrate, and a liquid crystal layer between the first substrate and the second substrate, the liquid crystal display device comprising:
   a first electrode provided on the first substrate; and
   a second substrate provided on the second substrate so as to face the first electrode via the liquid crystal layer,
   the liquid crystal layer being vertically aligned when no voltage is applied across the first electrode and the second electrode, and
   the liquid crystal layer having a twisted structure and being aligned parallel to the substrates when a voltage is applied across the first electrode and the second electrode,
   said liquid crystal display device having a defined value for d/p between 0.13 and 0.38, and
   said liquid crystal display device having a defined value for d·$\Delta$n/$\lambda$ between 0.61 and 0.82, where d/p is a ratio of a thickness d of the liquid crystal layer to a natural twist pitch p of a liquid crystal, a maximum applied effective voltage across the first electrode and the second electrode is 10V, and $\Delta n$ is a refractive anisotropy of the liquid crystal layer.

2. The liquid crystal display device as set forth in claim 1, wherein:

the liquid crystal layer includes a picture element region defined by the first electrode and the second electrode; and the picture element region includes at least one liquid crystal domain in which liquid crystal molecules under applied voltage are aligned radially or in an axially symmetrical manner.

3. The liquid crystal display device as set forth in claim 1, wherein:

the liquid crystal layer includes one or more picture element regions defined by the first electrode and the second electrode; and the first electrode has a portion that corresponds to the picture element region and in which one or more openings are formed, the opening and a solid section, which is a portion of the first electrode other than the opening, each having a liquid crystal domain in which alignment directions of liquid crystal molecules are controlled by an inclined electric field generated from edge portions of the opening when a voltage is applied across the first electrode and the second electrode.

4. The liquid crystal display device as set forth in claim 1, wherein:

a plurality of the openings are provided in each of the picture element regions; and the liquid crystal domain is formed for (i) each of the openings and for (ii) each of one or more unit solid sections, which is a portion of the solid section surrounded by the openings.

5. The liquid crystal display device as set forth in claim 1, wherein:

the openings are substantially identical with one another in shape and size, and each of the openings forms a unit lattice arranged to have rotational symmetry.

6. The liquid crystal display device as set forth in claim 5, wherein:

at least one of the openings has a rotationally symmetrical shape.

7. The liquid crystal display device as set forth in claim 6, wherein:

at least one of the openings has a substantially circular shape.

8. The liquid crystal display device as set forth in claim 1, wherein:

at least one of a plurality of the unit solid sections has a substantially circular shape.

9. The liquid crystal display device as set forth in claim 6, wherein:

at least one of a plurality of the unit solid sections has a substantially rectangular shape with substantially arc-shaped corners.

10. The liquid crystal display device as set forth in claim 1, wherein:

the liquid crystal layer has a dielectric anisotropy $\Delta \epsilon$ of from −2.5 to −6.5, and has an elastic constant ratio K11/K33 of from 0.9 to 2.0.

11. The liquid crystal display device as set forth in claim 1, wherein:

the first electrode comprises a plurality of picture element electrodes that respectively correspond to a plurality of the picture element regions; and the first substrate includes an active element that is provided for each of the picture element regions so as to switch the first electrode.

* * * * *